US007987206B2

(12) United States Patent
Murotani et al.

(10) Patent No.: US 7,987,206 B2
(45) Date of Patent: Jul. 26, 2011

(54) FILE-SHARING SYSTEM AND METHOD OF USING FILE-SHARING SYSTEM TO GENERATE SINGLE LOGICAL DIRECTORY STRUCTURE

(75) Inventors: Akira Murotani, Odawara (JP); Seiichi Higaki, Ninomiya (JP)

(73) Assignee: Hitachi Ltd., Tokyo (JP)

( * ) Notice: Subject to any disclaimer, the term of this patent is extended or adjusted under 35 U.S.C. 154(b) by 371 days.

(21) Appl. No.: 12/007,584

(22) Filed: Jan. 11, 2008

(65) Prior Publication Data

US 2008/0320051 A1  Dec. 25, 2008

(30) Foreign Application Priority Data

Jun. 19, 2007  (JP) ................................ 2007-160959

(51) Int. Cl.
  *G06F 7/00* (2006.01)
  *G06F 17/30* (2006.01)
(52) U.S. Cl. .................... 707/802; 707/610; 707/791
(58) Field of Classification Search .................. None
  See application file for complete search history.

(56) References Cited

U.S. PATENT DOCUMENTS

| 7,093,086 | B1 * | 8/2006 | van Rietschote | 711/161 |
| 7,197,520 | B1 * | 3/2007 | Matthews et al. | 1/1 |
| 7,203,949 | B2 * | 4/2007 | Shih | 720/654 |
| 7,213,246 | B1 * | 5/2007 | van Rietschote et al. | 718/1 |
| 7,246,200 | B1 * | 7/2007 | van Rietschote et al. | 711/114 |
| 7,293,133 | B1 * | 11/2007 | Colgrove et al. | 711/111 |
| 7,320,008 | B1 * | 1/2008 | Colgrove | 1/1 |
| 7,418,439 | B2 * | 8/2008 | Wong | 1/1 |
| 7,596,611 | B1 * | 9/2009 | Satish et al. | 709/223 |
| 7,809,776 | B1 * | 10/2010 | Witte et al. | 707/825 |
| 2003/0120685 | A1 * | 6/2003 | Duncombe et al. | 707/200 |
| 2004/0024975 | A1 * | 2/2004 | Morishita et al. | 711/147 |
| 2004/0039891 | A1 * | 2/2004 | Leung et al. | 711/165 |
| 2004/0193820 | A1 * | 9/2004 | Meiri et al. | 711/167 |
| 2004/0193945 | A1 * | 9/2004 | Eguchi et al. | 714/6 |
| 2005/0033828 | A1 * | 2/2005 | Watanabe | 709/219 |
| 2005/0091248 | A1 * | 4/2005 | Pitts | 707/100 |
| 2005/0172166 | A1 * | 8/2005 | Eguchi et al. | 714/20 |
| 2005/0198083 | A1 * | 9/2005 | Saika et al. | 707/204 |
| 2005/0283504 | A1 * | 12/2005 | Suzuki et al. | 707/202 |
| 2006/0010169 | A1 * | 1/2006 | Kitamura | 707/200 |

(Continued)

FOREIGN PATENT DOCUMENTS

JP   2003-058408   8/2001

(Continued)

*Primary Examiner* — Kuen S Lu
*Assistant Examiner* — Tuan Pham
(74) *Attorney, Agent, or Firm* — Volpe and Koenig, P.C.

(57) ABSTRACT

The file sharing system is able to provide a client with a single logical directory and reproduce the single logical directory in a remote site when the local site has stopped in use of a remote copy that is made between the local site and remote site. The first site provides the client with a logical directory that is constituted across respective nodes in the first site. The remote copy is executed between the first and second sites, and the data of both sites are synchronized. For the generation of the logical directory and the management of the remote copy, a common management table is used, and the management table is held by all of the nodes. In cases where the first site stops due to a fault, the second site utilizes information related to the remote copy in the management table to construct the logical directory and reproduces the logical directory to the second site.

8 Claims, 27 Drawing Sheets

U.S. PATENT DOCUMENTS

| | | |
|---|---|---|
| 2006/0020636 A1* | 1/2006 | Murotani ........................ 707/200 |
| 2006/0206603 A1* | 9/2006 | Rajan et al. .................... 709/223 |
| 2006/0248047 A1* | 11/2006 | Grier et al. ......................... 707/2 |
| 2007/0022083 A1 | 1/2007 | Carlson et al. |
| 2007/0083645 A1* | 4/2007 | Roeck et al. ................... 709/224 |
| 2007/0106714 A1* | 5/2007 | Rothbarth ..................... 707/204 |
| 2009/0077202 A1* | 3/2009 | Pitts ............................... 709/219 |

FOREIGN PATENT DOCUMENTS

JP 2007-35030 7/2006

\* cited by examiner

GNS/RC MANAGEMENT TABLE

| LOGICAL DIRECTORY (C11) | RESPONSIBLE NODE (C12) | ENTITY POSITION (C13) | COPY DESTINATION NODE + DIRECTORY# (C14) | | ENTITY POSITION (C15) |
|---|---|---|---|---|---|
| /gns/a | NODE A | /mnt/vol_10 | NODE F | #1 | /Home/001 |
| /gns/b | NODE B | /mnt/vol_11 | NODE F | #2 | /Home/002 |
| /gns/c | NODE C | /mnt/vol_12 | NODE G | #1 | /Home/001 |
| /gns/d | NODE D | /mnt/vol_13 | NODE G | #2 | /Home/002 |

LOCAL SITE TO REMOTE SITE

| /gns/a | NODE A | /mnt/vol_10 | | |
|---|---|---|---|---|
| C11 | C12 | C13 | C14 | C15 |

REMOTE SITE TO LOCAL SITE

| /gns/a | NODE A | /mnt/vol_10 | NODE F | #1 | /Home/001 |
|---|---|---|---|---|---|
| C11 | C12 | C13 | C14 | | C15 |

FIG. 7

GNS/RC MANAGEMENT TABLE T10

| C11 | C12 | C13 | C16 | C17 | C14 | | C15 |
|---|---|---|---|---|---|---|---|
| LOGICAL DIRECTORY | RESPONSIBLE NODE | ENTITY POSITION | SIZE | I/O VOLUME | COPY DESTINATION NODE + DIRECTORY # | | ENTITY POSITION |
| /gns/a | NODE A | /mnt/vol_10 | Size1_A | I/O_A | NODE F | #1 | /Home/001 |
| /gns/b | NODE B | /mnt/vol_11 | Sixe_B | I/O_B | NODE F | #2 | /Home/002 |
| /gns/c | NODE C | /mnt/vol_12 | Size_C | I/O_C | NODE G | #1 | /Home/001 |
| /gns/d | NODE D | /mnt/vol_13 | Size_D | I/O_D | NODE G | #2 | /Home/002 |

SYSTEM CONSTITUTION MANAGEMENT TABLE

| SITE NAME (C21) | NODE NAME (C22) | IP ADDRESS (C23) | MASTER RANKING (C24) | SUBMASTER RANKING (C25) | OTHER (C26) |
|---|---|---|---|---|---|
| LOCAL SITE | NODE A | IP_A | 1 | – | |
| LOCAL SITE | NODE B | IP_B | 2 | – | |
| LOCAL SITE | NODE C | IP_C | – | – | |
| LOCAL SITE | NODE D | IP_D | – | – | |
| REMOTE SITE | NODE F | IP_F | – | 1 | |
| REMOTE SITE | NODE G | IP_G | – | 2 | |

FIG. 18

T10A: GNS/RC MANAGEMENT TABLE

| C11 LOGICAL DIRECTORY | C12 RESPONSIBLE NODE | C13 ENTITY POSITION | C13A ENTITY POSITION | C14 COPY DESTINATION NODE + DIRECTORY # | C15 ENTITY POSITION | C15A ENTITY POSITION |
|---|---|---|---|---|---|---|
| /gns/a | NODE A | /mnt/vol_10 | SS#1, LU#10 | NODE F #1 | /Home/001 | SS#2, LU#20 |
| /gns/b | NODE B | /mnt/vol_11 | SS#1, LU#11 | NODE F #2 | /Home/002 | SS#2, LU#21 |
| /gns/c | NODE C | /mnt/vol_12 | SS#1, LU#12 | NODE G #1 | /Home/001 | SS#2, LU#22 |
| /gns/d | NODE D | /mnt/vol_13 | SS#1, LU#13 | NODE G #2 | /Home/002 | SS#2, LU#23 |

FILE-SHARING SYSTEM AND METHOD OF USING FILE-SHARING SYSTEM TO GENERATE SINGLE LOGICAL DIRECTORY STRUCTURE

CROSS-REFERENCE TO RELATED APPLICATIONS

This application relates to and claims priority from Japanese Patent Application No. 2007-160959 filed on Jun. 19, 2007, the entire disclosure of which is incorporated herein by reference.

BACKGROUND OF THE INVENTION

1. Field of the Invention

The present invention relates to a file sharing system and a method of using the file sharing system to generate a single logical directory structure.

2. Description of the Related Art

In order to share data between a plurality of computers that are distributed on a network, a file-sharing device known as NAS (Network Attached Storage) is used. Data are produced on a daily basis while the client terminals that utilize the data also increase. Hence, data of a large volume must be managed by using a plurality of NAS.

However, when accessing a desired file, a user must specify a physical NAS in which the file is stored and must access the NAS. In other words, even when the user knows the file name, unless the user knows the physical storage location of the file, it is not possible to access the file.

Therefore, only when a certain file is moved from a first NAS to a second NAS is it necessary to notify each user of the movement of the file. In addition, in cases where the NAS is added in order to improve the performance, an obsolete NAS is switched for a new NAS and the number of client terminals increases, for example, which is time-consuming for the system administrator. Therefore, in recent years, a system that generates a single logical directory structure by virtualizing the directory structures of the respective NAS has been proposed (Japanese Application Laid Open No. 2007-35030, Japanese Application Laid Open No. 2003-58408, U.S. Patent Application Number 2006/0010169).

In the prior art, the directory structures of a plurality of NAS are virtualized as a single logical directory structure and supplied to a client terminal. Hence, even when a physical NAS increase or reduction or the like occurs, this does not affect the logical directory structure. As a result, the user is able, by using the logical directory name used thus far, to access the desired file without consideration of the change to the physical constitution.

However, such patents are lacking with respect to disaster recovery. In a system where disaster recovery is considered, data are synchronized at a plurality of sites and, even when a first site stops due to a fault, access to a file at the second site is possible. Such patents do not disclose a system constitution that considers disaster recovery and, therefore, there is a margin for improvement with respect to fault tolerance.

SUMMARY OF THE INVENTION

The present invention was conceived in view of the above problems and an object thereof is to provide a file sharing system and a method of using the file sharing system to generate a single logical directory structure in order to be able to increase the fault tolerance. A further object of the present invention is to provide a file sharing system that is able to reproduce a single logical directory structure at a backup site when a fault occurs by synchronizing data between a plurality of sites with mutually different structures and to provide a method of using the file sharing system to generate a single logical directory structure. Yet another object of the present invention is to provide a file sharing system that is constituted to be able to reproduce a single logical directory structure relatively rapidly at a site with a different physical constitution when a fault occurs by integrating management information that is used to generate a single logical directory structure and management information that is used for copy control, as well as a method of using the file sharing system to generate the single logical directory. Further objects of the present invention will become evident from the description of the embodiments that will be provided subsequently.

In order to achieve the above object, a file sharing system having a first site and a second site according to the present invention is a file sharing system, wherein a plurality of first file sharing devices in the first site and a plurality of second file sharing devices in the second site are connected to enable mutual communication via a first communication path capable of data communication in file units, the system comprising: a logical directory supply section which, by using first management information for managing associated relationship between a single logical directory structure that is generated across the respective first file sharing devices and a first directory structure that the respective first file sharing devices comprise, supplies the logical directory structure that is formed by virtually integrating the respective first directory structures to a client device; a copy control section which, by using second management information for managing associated relationship between storage positions of the data managed by the respective first file sharing devices and storage positions of the data managed by the respective second file sharing devices, transmits and copies copy target data among the data stored in the respective first file sharing devices to second file sharing devices that are associated with the respective first file sharing devices; and a reproduction section which reproduces the logical directory structure that is formed by virtually integrating the respective second directory structure by using the first management information and the second management information in cases where a fault occurs at the first site.

According to an embodiment of the present invention, the structure of the volume used by the respective first file sharing devices to input and output data and the structure of the volume used by the respective second file sharing devices to input and output data are different.

According to an embodiment of the present invention, the first management information includes respective directory names of the logical directory structures, responsibility information for specifying predetermined first file sharing devices that are responsible for the respective directory names; and first storage position information for indicating the storage position of the data managed by the predetermined respective first file sharing devices; and the second management information includes the first storage position information, second storage position information for indicating the storage position of data managed by the respective second file sharing devices, and copy destination device information for specifying second file sharing devices that are associated with the predetermined first file sharing devices.

According to an embodiment of the present invention, the first management information and the second management information are stored in a common management table; the management table is constituted comprising respective directory names of the logical directory structures, responsibility information for specifying predetermined first file sharing devices that are each responsible for the respective directory names, first storage position information indicating the storage position of data managed by the respective predetermined first file sharing devices, copy destination device information for specifying predetermined second file sharing devices that each correspond with the respective predetermined first file sharing devices, and second storage position information indicating the storage positions of data managed by the respective second file sharing devices, and wherein the reproduction section reproduces the logical directory structures by treating the copy destination device information as the responsibility information in cases where a fault has occurred.

According to an embodiment of the present invention, the copy control section transmits and copies the copy target data from the first file sharing devices to the second file sharing devices via the first communication path.

According to an embodiment of the present invention, the respective first file sharing devices store and manage data in a first volume provided by a first storage device in the first site; the respective second file sharing devices store and manage data in a second volume provided by a second storage device in the second site; the first storage device and the second storage device are connected to enable mutual communication via a second communication path that is capable of data communication in block units; and the copy control section transfers and copies the copy target data from the first volume to the second volume via the second communication path.

According to an embodiment of the present invention, the second volume stores copy source volume identification information for identifying the first volume associated as the copy source with the second volume; and the reproduction section reproduces the logical directory structure that is formed by virtually integrating the respective second directory structure by using the copy source volume identification information, the first management information, and the second management information.

According to an embodiment of the present invention, the respective first file sharing devices and the respective second file sharing devices hold the first management information and the second management information; and, in cases where either the first site or the second site undergoes a change to the logical directory structure or a copy-related structure, differential information related to structural change is reported to the respective first file sharing devices and the respective second file sharing devices and the differential information is reflected in the first management information or the second management information held by the respective first file sharing devices and the respective second file sharing devices.

A method of generating a single logical directory structure by using a file sharing system according to another aspect of the present invention, the file sharing system having a first site having a plurality of first file sharing devices, a second site having a plurality of second file sharing devices, and a first communication path that is connected such that the respective first file sharing devices and the respective second file sharing devices are able to perform data communication in file units, the method comprising the steps of: setting first management information for managing associated relationship between a single logical directory structure which is generated across the respective first file sharing devices and a first directory structure that the respective first file sharing devices comprise; providing a client device with a logical directory structure that is made by using the first management information to virtually integrate the respective first directory structures; setting second management information for managing associated relationship between storage positions of data managed by the respective first file sharing devices and storage positions of data managed by the respective second file sharing devices; transmitting and copying copy target data among the data that are stored in the respective first file sharing devices to second file sharing devices that are associated with the respective first file sharing devices by using the second management information; detecting whether a fault has occurred at the first site; and reproducing the logical directory structure that is formed by virtually integrating the respective second directory structure by using the first management information and the second management information in cases where the occurrence of a fault is detected.

A file sharing system having a first site and a second site according to yet another aspect of the present invention, wherein (1) the first site comprises: (1-1) a plurality of first file sharing devices each having a first directory structure; (1-2) a first storage device which is connected via a first intra-site communication network to the respective first file sharing devices and which supplies a first volume to the first file sharing devices respectively; and (1-3) a master device that issues a predetermined report to the first file sharing devices respectively; and (2) the second site comprises: (2-1) a plurality of second file sharing devices each having a second directory structure and being provided in a number that differs from the number of first file sharing devices; (2-2) a second storage device which is connected via a second intra-site communication network to the respective second file sharing devices and which supplies a second volume to the second file sharing devices respectively; and (2-3) a submaster device that issues a predetermined report to the second file sharing devices respectively; (3) the respective first file sharing devices and the respective second file sharing devices are connected via a first communication path that is capable of data communication in file units and the first storage device and the second storage device are connected via a second communication path that is capable of data communication in block units; (4) the respective first file sharing devices, the respective second file sharing devices, the master device, and the submaster device each hold a management table and the management table is constituted comprising respective directory names that correspond to the respective node names of the logical directory structure, responsibility information for specifying predetermined first file sharing devices responsible for each of the directory names, first storage position information indicating storage positions of data managed by the respective predetermined first file sharing devices, copy destination device information for specifying predetermined second file sharing devices each corresponding to the respective predetermined first file sharing devices, and second storage position information indicating storage positions of data managed by the respective predetermined second file sharing devices; (5) the master device generates a single logical directory structure that is generated across the respective first file sharing devices by using the management table and supplies the single logical directory structure to a client device; (6) the respective first file sharing devices transmit data that are stored in the first volume to the respective second file sharing devices via the first communication path by using the management table and store the data in the second volume; and (7) the submaster device reproduces the logical directory structure by means of a second directory structure that the respective second file sharing devices comprise by treating the copy destination device information in the management table as the responsibility information in cases where the execution of a failover is instructed.

At least some of the respective parts and steps of the present invention can sometimes be implemented by a computer program. Such a computer program is stored in a logical device or distributed via a communication network, for example.

BRIEF DESCRIPTION OF THE DRAWINGS

FIG. 4 is an explanatory diagram showing the relationships between a logical directory and the respective nodes, or the like;

FIG. 5 is an explanatory diagram showing the constitution of the management table that is used for the architecture of the logical directory and in order to execute a remote copy;

FIG. 7 is an explanatory diagram showing another example of a management table;

FIG. 8 is an explanatory diagram showing a system constitution management table;

FIG. 18 is an explanatory diagram of a management table that is used for the architecture of a logical directory and for a remote copy;

DESCRIPTION OF THE PREFERRED EMBODIMENTS

Figure 1A:
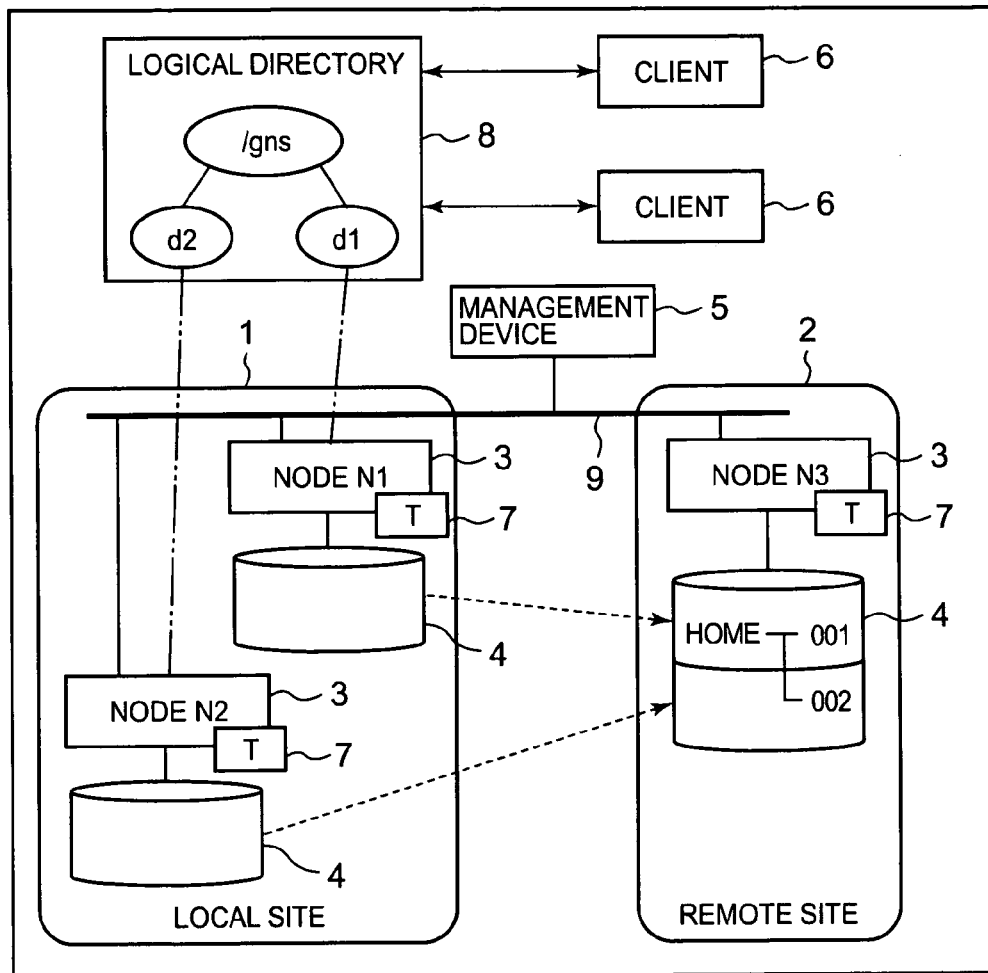
FIG. 1 is an explanatory diagram that provides an overview of the file sharing system according to an embodiment of the present invention.

FIG. 1 is an explanatory diagram that provides an overview of the file sharing system according to an embodiment of the present invention. The file sharing system shown in FIG. 1A comprises a first site 1 and a second site 2, for example, and a 'file sharing device' NAS node (sometimes abbreviated as 'node' hereinbelow) 3 and a volume 4 are each provided in the respective sites 1 and 2. Each NAS node 3, management device 5, and client device ('client' hereinbelow) 6 are connected so as to each be capable of mutual communication via a first communication path 9 that is capable of data communication in file units.

The first site 1 can be called a local site or main site and each client 6 is provided with a single logical directory 8. The logical directory 8 is made by virtually integrating the directory trees of the respective NAS nodes 3 in the first site 1 and the client 6 is able to access a file in logical directory 8 without being aware of the actual storage location of the file. For example, by making the names corresponding to the node names of the logical directories department names such as 'accounting department' and 'development headquarters', the user is able to access the required file without being completely aware of which NAS node the actual file group is stored in. The technology for generating a single logical directory is known as GNS (Global Name Space). Further, the GNS can be based on the technology disclosed in US2006-0010169A1 (U.S. patent application Ser. No. 10/886,892).

As mentioned above, the first site 1 is a site that provides each client 6 with a logical directory 8 and the second site 2 is a remote site (or backup site) that is provided in cases where the first site 1 has stopped. Each node 3 (N1, N2) in the first site 1 is able to use the volume 4. Volume 4 is provided by a storage device such as a disk array device, for example, as will become evident from the subsequent embodiment.

For example, at least one node 3 (N1, for example) among the respective nodes 3 in the first site 1 can be used as a master node. The master node 3 (N1) converts, by using a table T, a file access request that is issued by the client 6 into a file access request for a storage destination node 3 (N2, for example) that actually stores the requested file and transfers the converted file access request to the storage destination node 3 (N2).

In cases where the file access request is a request for write access, the storage destination node 3 (N2) directly receives write data from the client 6 and writes same to the volume 4 which is under the management of the storage destination node 3 (N2).

Thus, the master node 3 (N1) possesses a function for representatively receiving the access request from the client 6 and transferring the access request to a node (also called the responsible node) that actually stores the access destination file. As a result, the client 6 is provided with a single logical directory 8. The actual processing with respect to the file access request is carried out by the responsible node 3 (N2) and the processing result is transmitted directly from the responsible node 3 (N2) to the client 6. When the access destination file is stored in volume 4 of the master node 3

(N1), the master node 3 (N1) processes file access with the master node 3 (N1) itself serving as the responsible node.

The master node 3 (N1) performs work to manage the relationship between file access requests from the client 6 (access path) and the actual responsible node 3 (N2) and distribute the access requests to the responsible node 3 (N2). Hence, for example, although different depending on the number of clients 6 and the processing function and so forth of the node, the processing load of the master node 3 (N1) may be thought of as being higher than that of the other node 3 (N2). Therefore, the master node 3 (N1) need not comprise volume 4 and may be dedicated to the provision of a logical directory 8. In addition, in cases where a fault occurs with master node 3 (N1), another node 3 (N2) in the first site 1 can also be preset as a second master node.

Similarly to the first site 1, the second site 2 comprises NAS node 3 and volume 4. Although, for the sake of convenience of the paper, the second site 2 shows only one node 3 (N3) but, as will also be evident from the subsequent embodiments, a plurality of nodes 3 can actually be provided in the second site 2.

The second site 2 is a backup site that is provided in cases where the first site 1 has stopped. The second site 2 stores the same file group as the file group managed by the respective nodes 3 (N1, N2) in the first site 1, in volume 4 in the second site 2. That is, a remote copy is made by taking the respective nodes 3 (N1, N2) in the first site 1 as the copy source nodes and the node 3 (N3) in the second site 2 as the copy destination node.

A remote copy is made in file units via a first communication path 9 such as the Internet or LAN (Local Area Network), for example. By creating a plurality of directories in one volume 4, the copy destination node 3 (N3) is able to collectively hold a plurality of copy source directories in one volume 4.

That is, in the example shown in FIG. 1, the directory of the first copy source node 3 (N1) is associated with a first directory (/Home/001) of the copy destination node 3 (N3) and the directory of the other copy source node 3 (N2) is associated with a second directory (/Home/002) of the copy destination node 3 (N3). The copy destination node 3 (N3) can receive and save data from the plurality of copy source nodes 3 (N1 and N2) by preparing a plurality of copy destination directories.

In other words, the constitution of the physical resources in the first site 1 and the constitution of the physical resources in the second site 2 differ. Generally speaking, the second site 2 is created with a smaller physical resource amount than the first site 1. This is because the second site 2 is a backup site and in order to reduce the overall cost of the system.

Figure 1B:
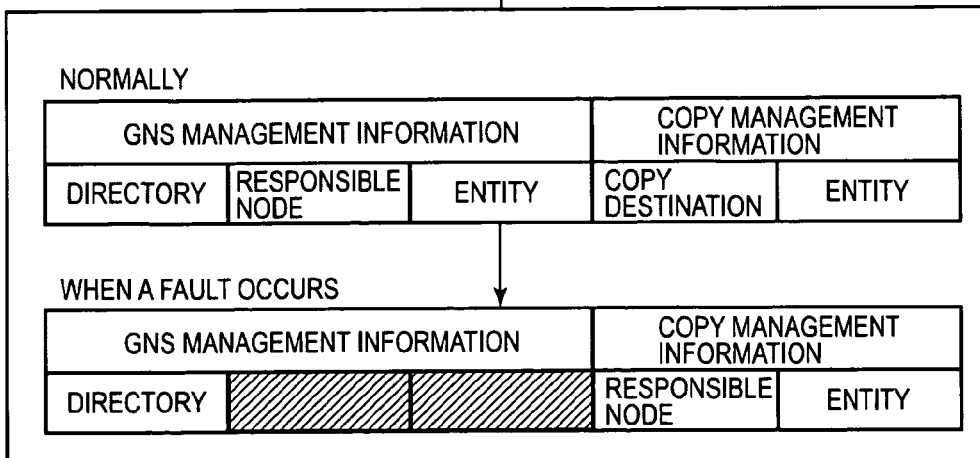

The respective nodes 3 of the respective sites 1 and 2 share management table T. In other words, all of the nodes 3 in the system save the same management table T. An overview of the constitution of table T is shown in FIG. 1B.

Management table T comprises GNS management information and copy management information, for example. GNS management information is information that is required in order to construct a logical directory 8 and is constituted comprising, for example, information for specifying the directory name of the logical directory and the node responsible for the directory as well as information indicating the positions in which the file groups managed by the directory are really stored (shown as 'entities' in FIG. 1B).

The copy management information is information that is required in order to copy and store a copy target file group that is in the first site 1 in the second site 2. The copy management information is constituted comprising, for example, information for specifying the copy source node, information for specifying the whereabouts of copy target data, information for specifying the copy destination node, and information indicating the storage destination of the copy target data (shown as 'entity' in FIG. 1B).

The 'responsible node' that is used by the GNS management information corresponds to the copy source node. Information indicating the whereabouts of the copy target data corresponds to 'entity' which is used by the GNS management information. Hence, the management table T integrates and manages GNS management information and copy management information.

As mentioned earlier, the master node 3 (N1) converts a file access request from client 6 on the basis of the GNS management information in the management table T into a file access request that is used for the responsible node and transfers the converted file access request. The respective nodes 3 (N1 and N2) in the first site 1 transmit and copy target data to a predetermined directory of the copy destination node by using management table T.

If a disaster befalls the first site 1 and same stops, operational processing is continued by using the second site 2. The submaster node 3 (N3) in the second site 2 reproduce the logical directory 8 in the second site 2 on the basis of an explicit instruction from the management device 5, for example. As mentioned earlier, in order to construct logical directory 8, information for specifying the directory name of the logical directory and the node that is responsible for the directory and information indicating the position in which the file group managed by the directory is actually stored is required.

As shown at the bottom of FIG. 1B, in cases where a fault occurs in the first site 1, the submaster node 3 (N3) handles the 'copy destination node' of the copy management information as information that is the same as the 'responsible node'. As a result, the client 6 is able to request file access on the basis of the logical directory 8 and the file access request can be processed by using a file group that is saved in the second site 2.

In other words, by using the management table T that is used in both the GNS management and the copy management, by handling 'copy destination node' as the responsible node, all of the information required to reproduce the logical directory 8 can be obtained.

In this embodiment that is constituted in this manner, by utilizing a remote copy that is executed between the respective sites 1 and 2, a logical directory 8 can be reproduced at the second site 2 when the first site 1 is stopped.

In other words, in this embodiment, a plurality of sites 1 and 2 are corrected by a first communication path 9 and data in the first site 1 and data in the second site 2 are synchronized beforehand and, in cases where a fault occurs at the first site 1, a logical directory 8 can be reproduced in the second site 2. Therefore, logical directory 8 can be provided by improving the fault tolerance even in cases where the constitution of the physical resources between the respective sites 1 and 2 is different.

In this embodiment, management table T, which integrates the GNS management information and copy management information, is employed and, in cases where a fault occurs at the first site 1, the logical directory 8 can be reproduced at the second site 2 relatively rapidly by treating part of the copy management information (information indicating the storage destination of the copy target data and information specifying the copy destination node) as part of the GNS management information (information for specifying the responsible node and information indicating the storage destination of the real data). Embodiments of the present invention will be described in detail hereinbelow.

First Embodiment

Figure 2:
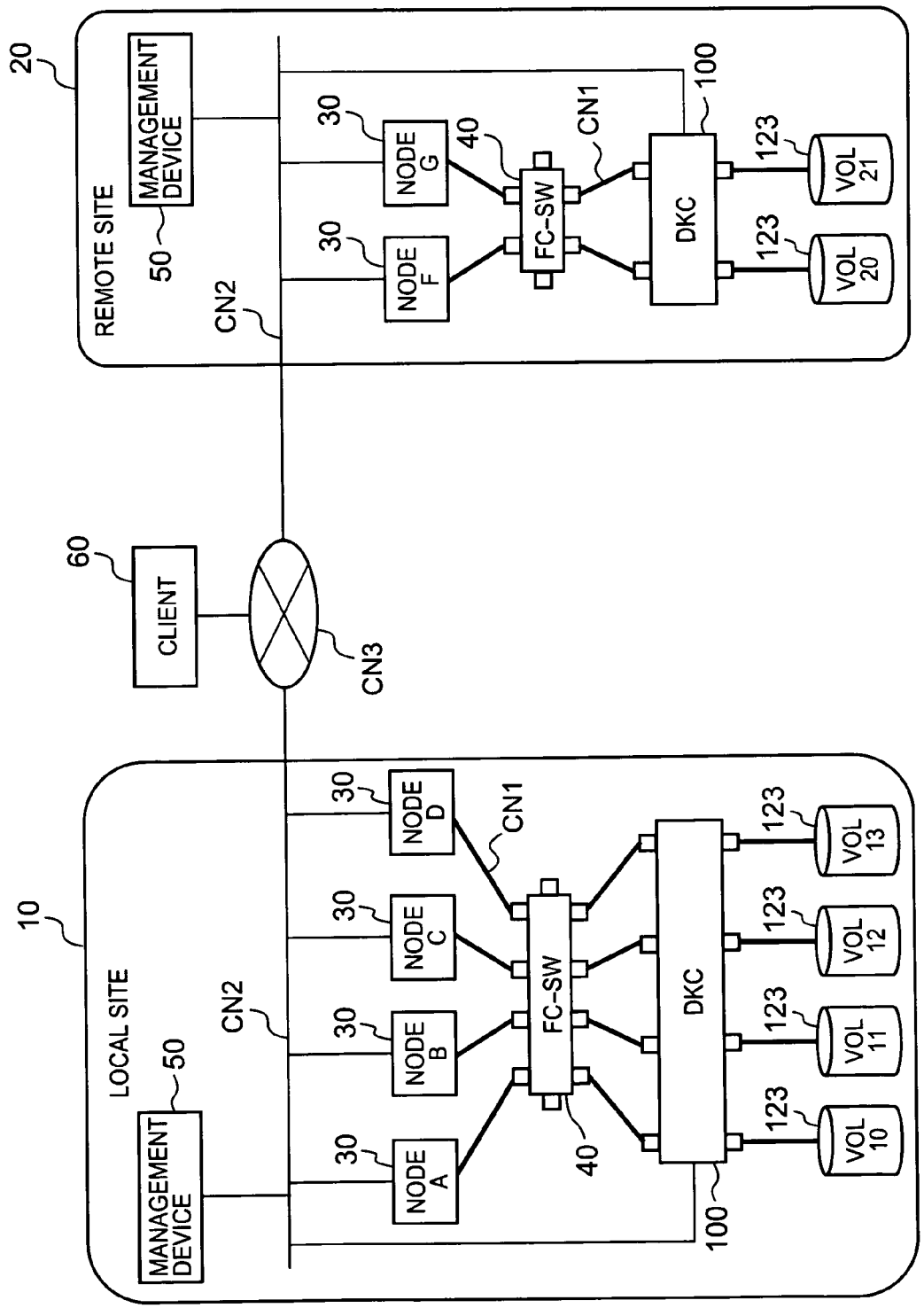
FIG. 2 is an explanatory diagram showing the overall constitution of the file sharing system.

FIG. 2 is an explanatory diagram indicating the overall constitution of the file sharing system according to this embodiment. In this system, the local site 10 and remote site 20 are connected via an inter-site network CN3 such as a LAN or the Internet, for example.

The respective sites 10 and 20 can each comprise a plurality of NAS nodes 30, a switch 40, a management device 50, and a storage device 100, and so forth, for example. The respective nodes 30 are connected via an intra-site network CN2, within the respectively positioned sites. Further, the intra-site network CN2 within the respective sites 10 and 20 are connected via an intra-site network CN3.

A plurality of clients 60 that use the logical directory to access files are connected to the intra-site network CN3 (only one is shown). The management device 50 can also be individually provided within each of the sites 10 and 20 and can also be provided in sites spaced apart from the two sites 10 and 20. The role of the management device 50 will be described subsequently.

Here, the relationship with FIG. 1 will be described. The local site 10 corresponds to the first site 1 in FIG. 1; the remote site 20 corresponds to the second site 2 in FIG. 1; the NAS node 30 corresponds to the NAS node 3 in FIG. 1; the management device 50 corresponds to the management device 5 in FIG. 1; and the client 60 corresponds to the client 6 in FIG. 1. A logical volume 123 corresponds to volume 4 in FIG. 1, and the subsequently described management table T10 corresponds to the management table T in FIG. 1.

The local site 10 will now be described. The local site 10 normally provides client 60 with GNS. The respective nodes 30 (A to D) in the local site 10 are connected to the storage device (DKC in FIG. 2) 100 via the switch 40 that is constituted as a Fibre Channel switch, for example. The respective nodes 30 are associated with volume 123 that is provided by the storage device 100. The respective nodes 30 are able to read and write data to their respective volumes 123 which are allocated thereto.

The remote site 20 is a site that is provided in cases where a fault occurs in the local site 10. The respective nodes 30 (F, G) in the remote site 20 are also connected to the storage device 100 via switch 40 in order to use the volumes 123 allocated thereto.

Figure 3:
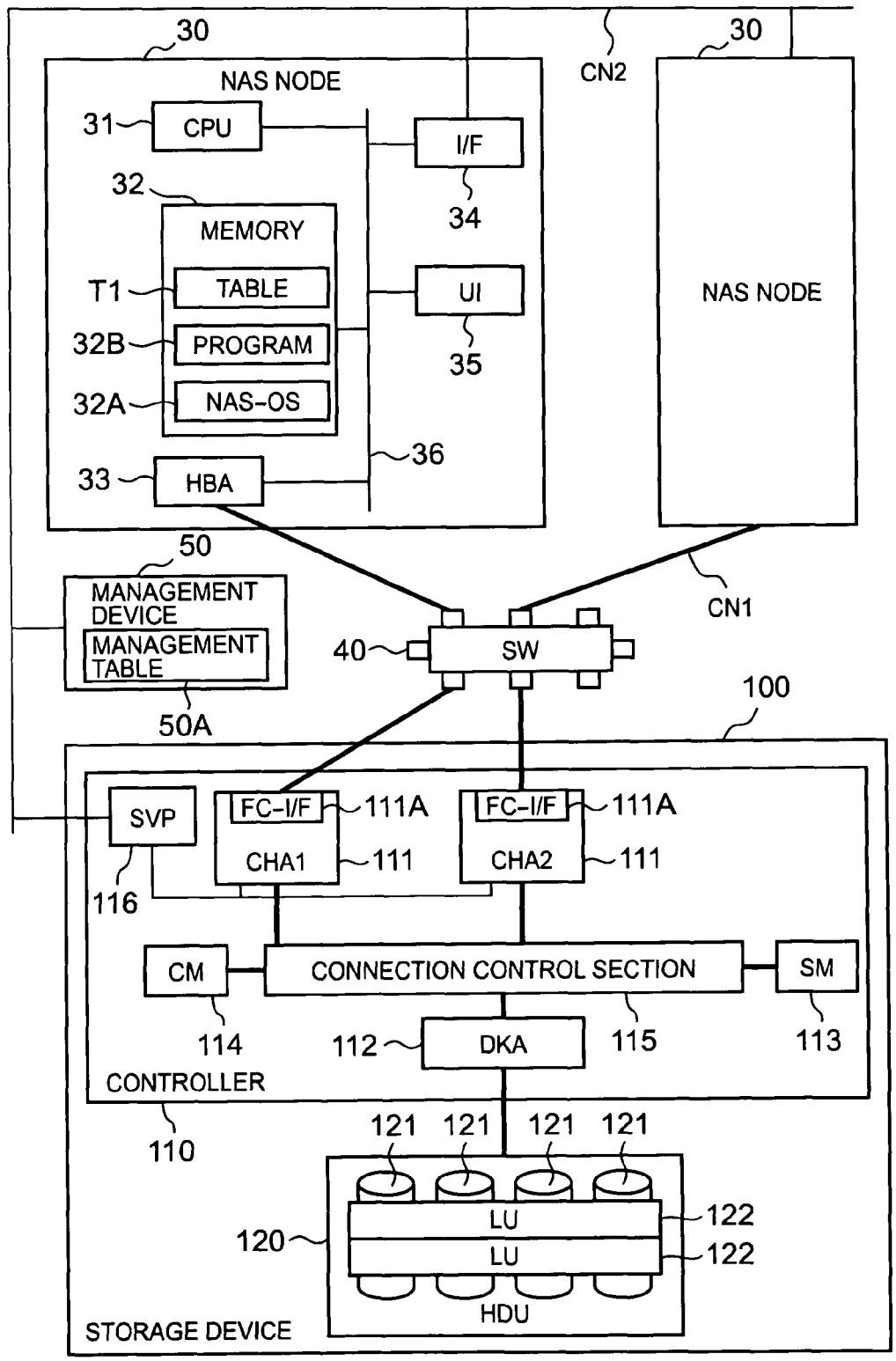
FIG. 3 is an explanatory diagram showing the hardware constitution in one site.

FIG. 3 is an explanatory diagram that provides a detailed view of the constitution within one site. The NAS node 30 comprises, for example, a microprocessor ('CPU' in FIG. 3) 31, a memory 32, a lower communication interface section (HBA in FIG. 3) 33, an upper communication interface ('I/F' in FIG. 3) 34, and a user interface section (UI in FIG. 3) 35. The respective parts 31 to 35 are connected by a bus 36.

Memory 32 is able to store a NAS-OS 32A, various programs 32B, and a table T1, for example. The NAS-OS 32A is an operating system for performing file sharing. The various programs 32B are programs for implementing GNS generation functions and remote copy functions and so forth described subsequently. Table T1 is a table that is used for GNS generation and remote copies. By executing the OS 32A, program 32B, and microprocessor 31, the NAS node 30 implements file sharing services and so forth.

The lower communication interface section 33 is for communicating in block units with the storage device 100 on the basis of the Fibre Channel protocol, for example. The upper communication interface 34 is for performing communication in file units with the other NAS nodes 30 and clients 60 based on the TCP/IP (Transmission Control Protocol/Internet Protocol), for example. The user interface section 35 comprises an information output device such as a display device and an information input device such as a keyboard switch, for example.

The management device 50 is a computer device comprising a management tool 50A for managing each node 30 and storage device 100. The management device 50 supplies various instructions (described subsequently) to the respective nodes 30 or is able to change the constitution of the storage device 100. Possible examples of changes to the constitution of the storage device 100 include the generation and deletion of a volume 123 and changes in the connection destination of volume 123, for example.

The storage device 100 is constituted comprising, for example, a controller 110, a storage device-mount section (HDU in FIG. 3) 120, for example. The controller 110 controls the operation of the storage device 100. The controller 110 is constituted comprising, for example, a plurality of channel adapters ('CHA' hereinbelow) 111, a plurality of disk adapters (only one is shown in FIG. 3; called 'DKA' hereinbelow) 112, a shared memory ('SM' in Figs.) 113, a cache memory ('CM' hereinbelow) 114, a connection control section 115, and a service processor ('SVP' hereinbelow) 116.

The CHA 111 is a computer device for performing FCP (Fibre Channel Protocol)-based communications, for example. The CHA 111 is constituted by one or a plurality of substrates on which a microprocessor and memory are mounted, for example, and the memory stores a program or the like for analyzing and executing FCP-based commands. The CHA 111 comprises at least one or more fibre channel interfaces (displayed as FC-I/F in FIG. 3) 111A. The fibre channel interface 111A has a preset WWN.

The DKA 112 exchanges data with the disk drives 121 of the HDU 120. The DKA 112 is constituted as a computer device comprising a microprocessor and memory and so forth as per the CHA 111. Although one DKA 112 is shown for the sake of convenience in FIG. 3, a plurality of DKA 112 are actually provided.

DKA 112 is connected to the respective disk drives 121 in the HDU 120 via a fibre channel. The DKA 112 writes data that have been received by the respective CHA 111 and stored in the cache memory 114 at a predetermined address in a predetermined disk drive 121. The DKA 112 reads data requested by the respective CHA 111 from a predetermined disk drive 121 and stores the data in the cache memory 114.

The DKA 112 converts a logical address into a physical address. A logical address is an address that indicates the block position of a logical volume and is called an LBA (Logical Block Address). A physical address is an address that indicates the write position in the disk drive 121. The DKA 112 performs data access that corresponds with a RAID configuration in cases where the disk drive 121 is managed in accordance with RAID. For example, the DKA 112 writes the same data to a plurality of disk drives 121 (RAID1) or executes a parity calculation and distributes and writes the data and parity to the plurality of disk drives 121 (RAID5 or similar).

The shared memory 113 or the like is memory for storing various management information and control information and so forth that are used in order to control the operation of the storage device 100. The cache memory 114 is memory for storing data received by the CHA 111 or for storing data which are read from the disk drive 121 by the DKA 112.

Any one or a plurality of the disk drives 121 may be used as a cache disk. As shown in FIG. 3, the cache memory 114 and shared memory 113 may also be constituted as separate memory. Alternatively, a partial storage area of the same memory may be used as the cache area and another storage area may be used as the control area.

The connection control section 115 mutually connects the CHA 111, DKA 112, cache memory 114, and shared memory 113. The connection control section 115 is constituted as a crossbar switch or the like that transfers data by means of a high-speed switching operation, for example.

An SVP 116 is connected to each CHA 111 via a communication network such as a LAN, for example. The SVP 116 is able to access the DKA 112, cache memory 114, and shared memory 113 via the CHA 111, for example. The SVP 116 collects information related to various states in the storage device 100 and supplies this information to the management device 50. The user is able to learn various states of the storage device 100 via the screen of the management device 50.

The SVP 116, upper communication interface section 34 in each node 30, and management device 50 are connected so as to be capable of two-way communication via an intra-site network CN2. The user is able to set the access path between the NAS device 10 and logical volume, for example, via the SVP 116, from the management device 50, generate a logical volume 122, and delete the logical volume 122.

The HDU 120 comprises a plurality of disk drives 121. Although disk drives are given by way of example in this specification, the present invention is not limited to hard disk drives. For example, various storage devices and equivalents thereof such as semiconductor memory drives (including flash memory devices) and holographic memory can be used. In addition, disks of different types, such as FC (Fibre Channel) disks and SATA (Serial AT Attachment) disks, for example, can also be mixed in the HDU 120.

One RAID group (also known as a parity group) can be formed by a plurality of disk drives 121. A RAID group virtualizes the physical storage area of the respective disk drives 121 in accordance with the RAID level and can be called a physical storage device. A physical storage area of a RAID group can be provided with one or a plurality of logical devices 122 of a predetermined size or optional size. The logical device 122 is displayed as 'LU' in FIG. 3. By associating one or a plurality of logical devices 122 with a LUN (Logical Unit Number), a logical volume 123 is generated and recognized by the NAS node 30. When logical volume 123 is always generated by using one logical device 122, the logical volume 123 and logical volume 122 means substantially the same component. However, one logical volume 123 is sometimes also constituted by a plurality of logical devices 122.

The data I/O operation of the storage device 100 will now be explained in simple terms. A read command that is issued by the NAS node 30 is received by the CHA 111. The CHA 111 stores the read command in the shared memory 113.

The DKA 112 references the shared memory 113 as required. Upon discovering an unprocessed read command, the DKA 112 accesses a disk drive 121 that constitutes the logical volume 122 that is designated as a read destination and reads the required data. The DKA 112 performs conversion processing between physical addresses and logical addresses and stores the data read from the disk drive 121 in the cache memory 114.

The CHA 111 transmits data that are stored in the cache memory 114 to the NAS node 30. When data requested by the NAS node 30 are already stored in the cache memory 114, the CHA 111 transmits data stored in the cache memory 114 to the NAS node 30.

A write command that is issued by the NAS node 30 is received by the CHA 111 as in the case of a read command. The CHA 111 stores write data that have been transmitted from the NAS node 30 in the cache memory 114. The DKA 112 stores write data stored in the cache memory 114 in a disk drive 121 that constitutes the logical volume 122 which has been designated as the write destination.

Further, the constitution may be such that the end of processing is reported to the NAS node 30 at the point where write data are stored in the cache memory 114 or the constitution may be such that the end of processing is reported to the NAS node 30 after the write data have been written to the disk drive 121.

Figure 4A:
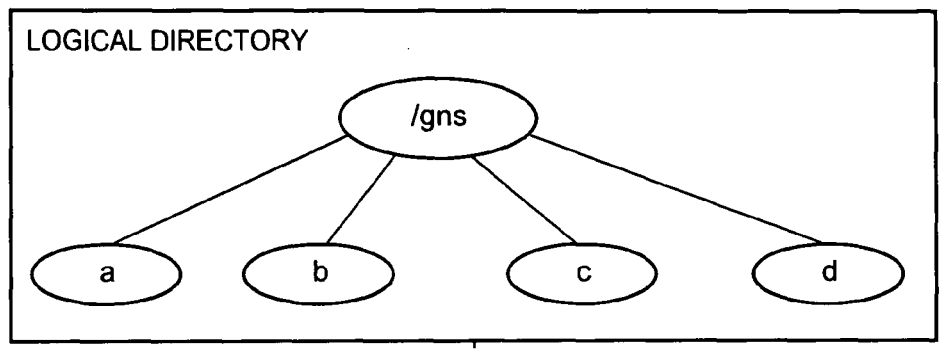

FIG. 4 is an explanatory diagram showing the constitution of the remote copy between the respective sites 10 and 20 and the relationships between the logical directory structure and the respective nodes 30. FIG. 4A is an explanatory diagram that shows the constitution of the logical directory in simplified form. In this embodiment, a case where four directories '/a to /d' are provided below the root directory '/gns' is given as an example.

Figure 4B:
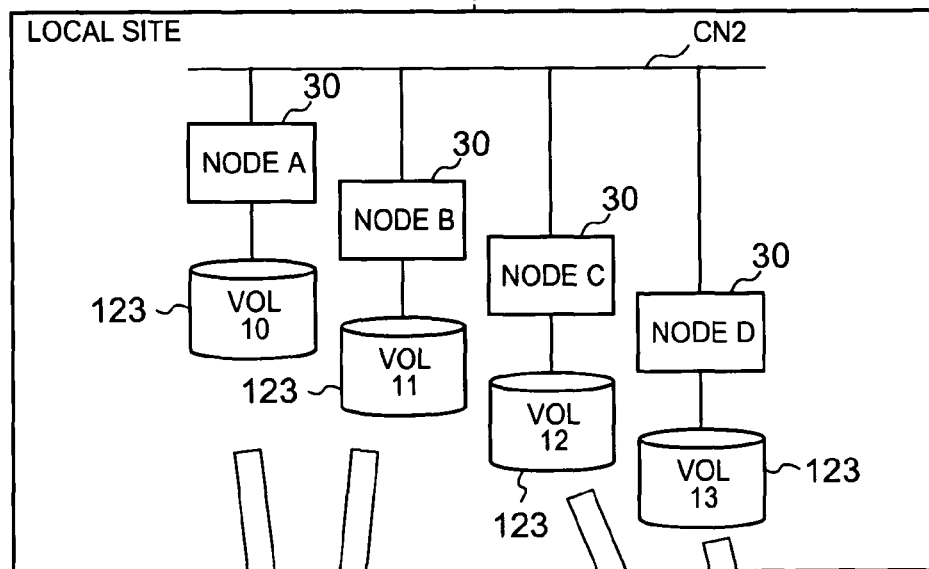

FIG. 4B shows the respective nodes 30 and volumes 123 in local site 10 in simplified form. The respective nodes 30 (A to D) in the local site 10 correspond with the respective directories (/a to /d) of the logical directory. In this embodiment, node 30 (A) is the master node and node 30 (F) is the sub-master node.

Figure 4C:
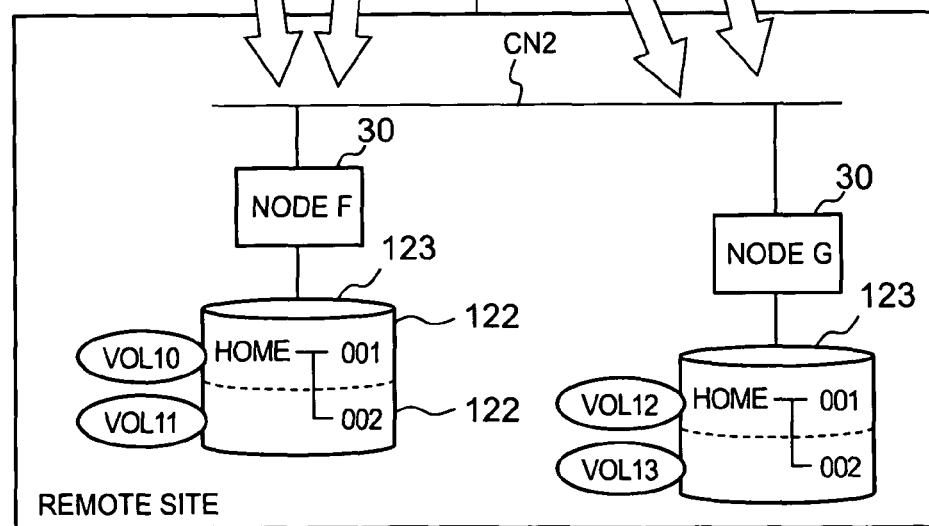

FIG. 4C shows the respective nodes 30 and volumes 123 of remote site 20. The respective nodes 30 (F, G) in the remote site 20 correspond to copy destination nodes. The nodes 30 (A to D) in the local site 10 each correspond to copy source nodes. The respective copy destination nodes 30 (F, G) are each associated with a plurality of copy source nodes 30.

In other words, in this embodiment, the copy destination node 30 (F) is associated with a plurality of copy source nodes 30 (A, B). The copy destination node 30 (F) stores data that are the same as the data managed by the respective copy source nodes 30 (A, B) in the volume 123 which is allocated to the copy destination node 30 (F). Likewise, the copy destination node 30 (G) is associated with a plurality of copy source nodes 30 (C, D). The copy destination node 30 (G) stores the same data as the data managed by the respective copy source nodes 30 (C, D) in the volume 123 which is allocated to the copy destination node 30 (G).

Directories in a quantity corresponding with the number of copy source nodes are created in the volume 123 allocated to the copy destination node. In volume 123, which is used by the copy destination node 30 (F), a file group that is managed by the copy source node 30(A) is stored at '/Home/001' and a file group that is managed by the copy source node 30 (B) is stored at '/Home/002'. Likewise, in volume 123 that is used by copy destination node 30 (G), a file group that is managed by the copy source node 30(C) is stored at '/Home/001' and a file group that is managed by the copy source node 30 (D) is stored at '/Home/002'.

A plurality of copy source volumes are associated with the copy destination volume 123. Hence, the copy destination volume 123 in the remote site 20 may also be constituted by linking a plurality of logical devices 122. In this case, as will be described subsequently in the fourth embodiment, the constitution of the remote site can be changed with the intention of distributing the access load.

FIG. 5 is an explanatory diagram of an example of management table T10 which is used for the generation of a logical directory (GNS) and a remote copy (RC). The management table T10 associates and manages the logical directory field C11, a responsible node field C12, an entity position field C13, a copy destination node field C14, and a copy destination entity position field C15, for example.

The logical directory field C11 indicates the directory name of a logical directory. The responsible node field C12 indicates the NAS node 30 that is responsible for the directory. The entity position field C13 indicates the position in which the data managed by the responsible node are actually stored, that is, the data storage location. The copy destination node field C14 specifies the node for storing the data (file group) of the respective copy source nodes 30 (A to D) in the local site 10. As mentioned earlier, the copy destination nodes 30 (F, G) can be associated with a plurality of copy source nodes. In cases where the copy destination nodes 30 (F, G) are associated with a plurality of copy source nodes, a directory is prepared for each of the copy source nodes at the copy destination nodes.

As shown in the middle of FIG. 5, in cases where the management table T10 is defined, all or some of the records of the management table T10 are transmitted in a state where C14 and C15 are blank fields from the local site 10 to the remote site 20. When the system is initially set, all of the records of the management table T10 are transmitted from the local site 10 to the remote site 20. However, in the event of a partial constitutional change, only those records related to the partial constitutional change are transmitted from the local site 10 to the remote site 20. As shown in the lower part of FIG. 5, fields C14 and C15 are entered for the remote site 20 and all or some of the records of management table T10 are transmitted from the remote site 20 to local site 10.

Figure 6:
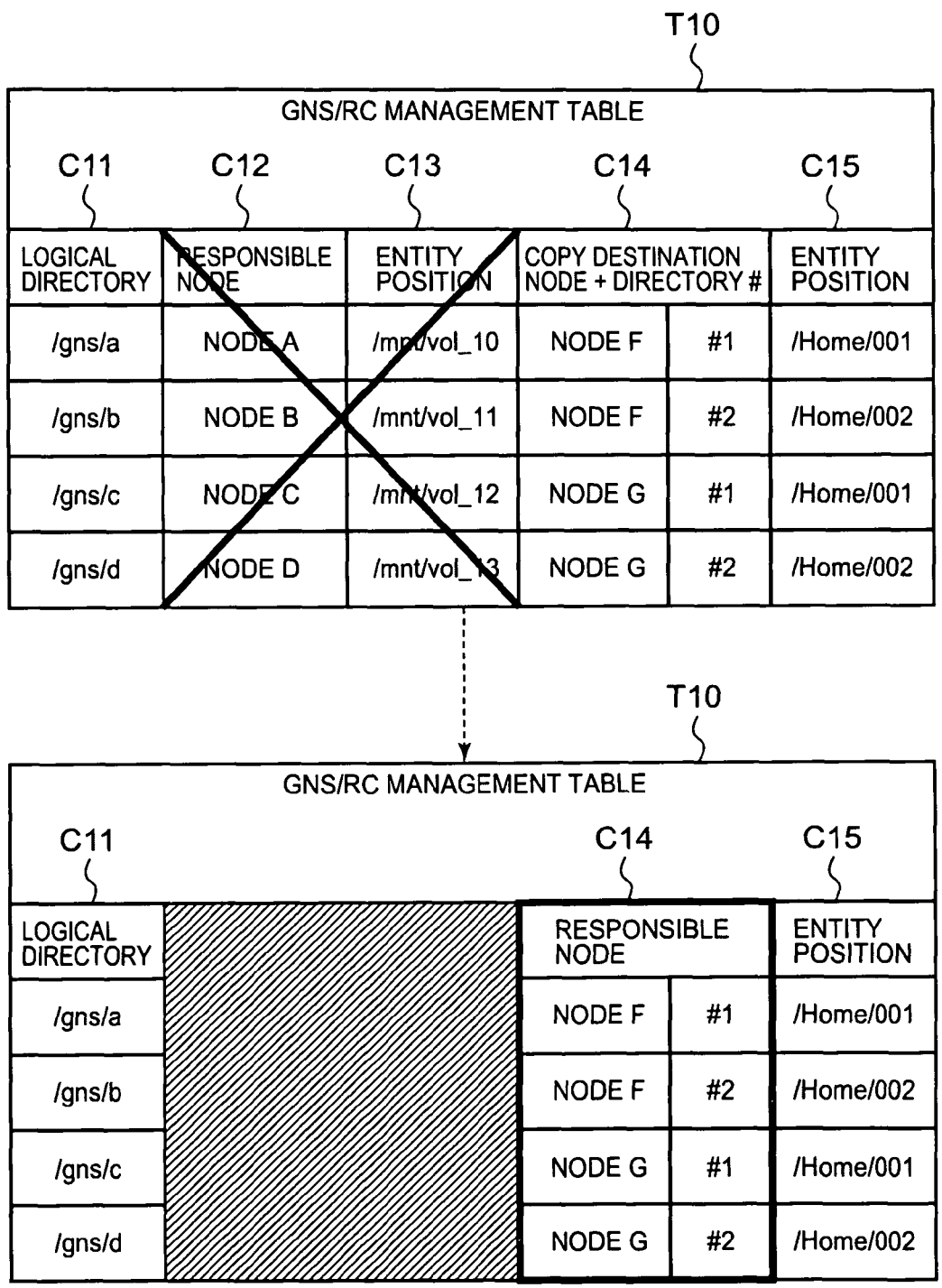
FIG. 6 is an explanatory diagram showing an aspect that changes the method of using the management table in cases where a fault occurs in a local site.

FIG. 6 is an explanatory diagram that schematically shows an aspect where the treatment of the management table T10 is changed in cases where a fault occurs at local site 10. As shown in the upper part of FIG. 6, in cases where a disaster befalls the local site 10, the respective responsible nodes 30 (A to D) stop functioning and are no longer able to process a file access request from the client 60.

Therefore, as shown in the lower part of FIG. 6, the remote site 20 reproduces a logical directory (GNS) in the remote site 20 by treating the copy destination node field C14 as a field with the same information as that of the 'responsible node field'. More precisely, the submaster node 30 (F) in the remote site 20 interrupts the usage of the responsible node field C12 and entity position field C13 in the management table T10 and uses the copy destination node field C14 and the copy destination entity position field C15 as the responsible node field C12 and entity position field C13.

The alternative responsible nodes 30 (F, G) hold the same file groups as the file groups that are managed by the copy source nodes 30 (A to D) which are the original responsible nodes. Therefore, the same logical directory as before the disaster can be reproduced even when responsible nodes corresponding to the directory responsible for the node name of the logical directory are switched from the original responsible nodes 30 (A to D) to the copy destination nodes 30 (F, G).

FIG. 7 is an explanatory diagram showing another example of the management table T10. In addition to the name fields C11 to C15, the size field C16 and I/O (Input/Output) volume field C17 can also be managed by the management table T10.

The size field C16 indicates the total capacity of the file groups stored in the respective directories of the logical directory. The I/O volume field C17 indicates the frequency of file access by the client 60 with respect to each directory of the logical directory.

FIG. 8 is an explanatory diagram showing an example of a system constitution management table T20. The system constitution management table T20 serves to manage the constitution of the file sharing system. The management table T20 associates and manages a site name field C21, a node name field C22, an IP address field C23, a master ranking field C24, a submaster ranking field C25, and another field C26, for example.

The site name field C21 stores information indicating either the local site 10 or remote site 20. The node name field C22 stores information for identifying each node 30. The IP address field C23 stores address information for accessing each node 30. The master ranking field C24 stores the ranking of the node for the master node. Likewise, the ranking of the node which is the submaster node is stored in the submaster ranking field C25. The other field C26 is able to store, for example, the processing performance of each node. The node with the youngest master ranking or submaster ranking value operates as the master node or submaster node. In cases where the master node or submaster node stops as a result of maintenance work, the next-ranked node operates as the master node or submaster node.

Figure 9:
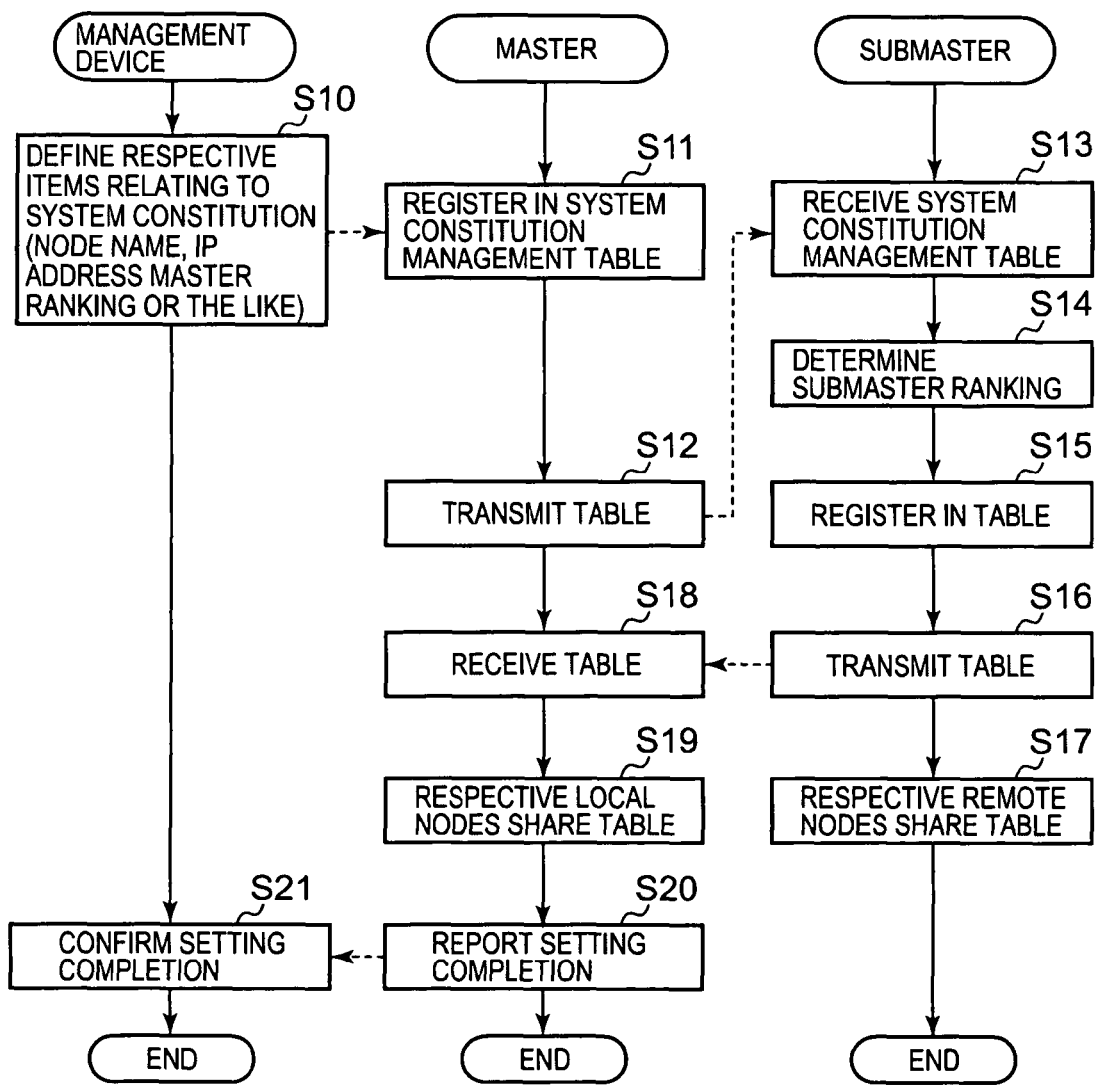
FIG. 9 is a flowchart showing the processing for storing the system constitution management table for each node.

FIG. 9 shows the processing to define the system constitution management table T20 and for sharing the system constitution management table T20 with the respective nodes 30. The respective flowchart shown hereinbelow provides an overview of the respective processing to the extent required to understand and implement the present invention and sometimes differs from the actual computer program. A so-called person skilled in the art is surely able to change and delete the illustrated steps and add steps which are not intrinsically new and so forth.

The user uses the management device 50 to set each of the values of the respective items of the C21 to C24 and C26 in the master node management table T20 (S10). A case where the submaster ranking is determined by the remote site 20 will be described. Further, in the following description, a node 30 in the local site 10 will sometimes be called a 'local node' and a node in the remote site 20 will sometimes be called a 'remote site'.

The master node registers the value input from the management device 50 in the system constitution management table T20 (S11) and transmits the management table T20 to the submaster node in the remote site 20 (S13).

Upon receipt of the management table T20 from the master node (S13), the submaster node determines the submaster ranking (S14) and registers same in the management table T20 (S15). The submaster node transmits the management table T20 to which the submaster ranking has been added to the master node (S16). In addition, the submaster node holds the same management table T20 in each remote node by transmitting the management table T20 to each remote node (S17).

Upon receipt of the management table T20 from the submaster node (S18), the master node transmits the management table T20 to each local node to share the same management table T20 with each local node (S19). As a result, because the same system constitution management table T20 is passed to all the nodes in the system, the master node reports the fact that the definition of the system constitution is complete to the management device 50 (S20). The management device 50 confirms the fact that the definition of the system constitution is complete (S21). Further, the constitution may be such that the user sets the submaster ranking in S10. In this case, S14, S15, S16, and S18 are removed from the flowchart in FIG. 9.

Figure 10:
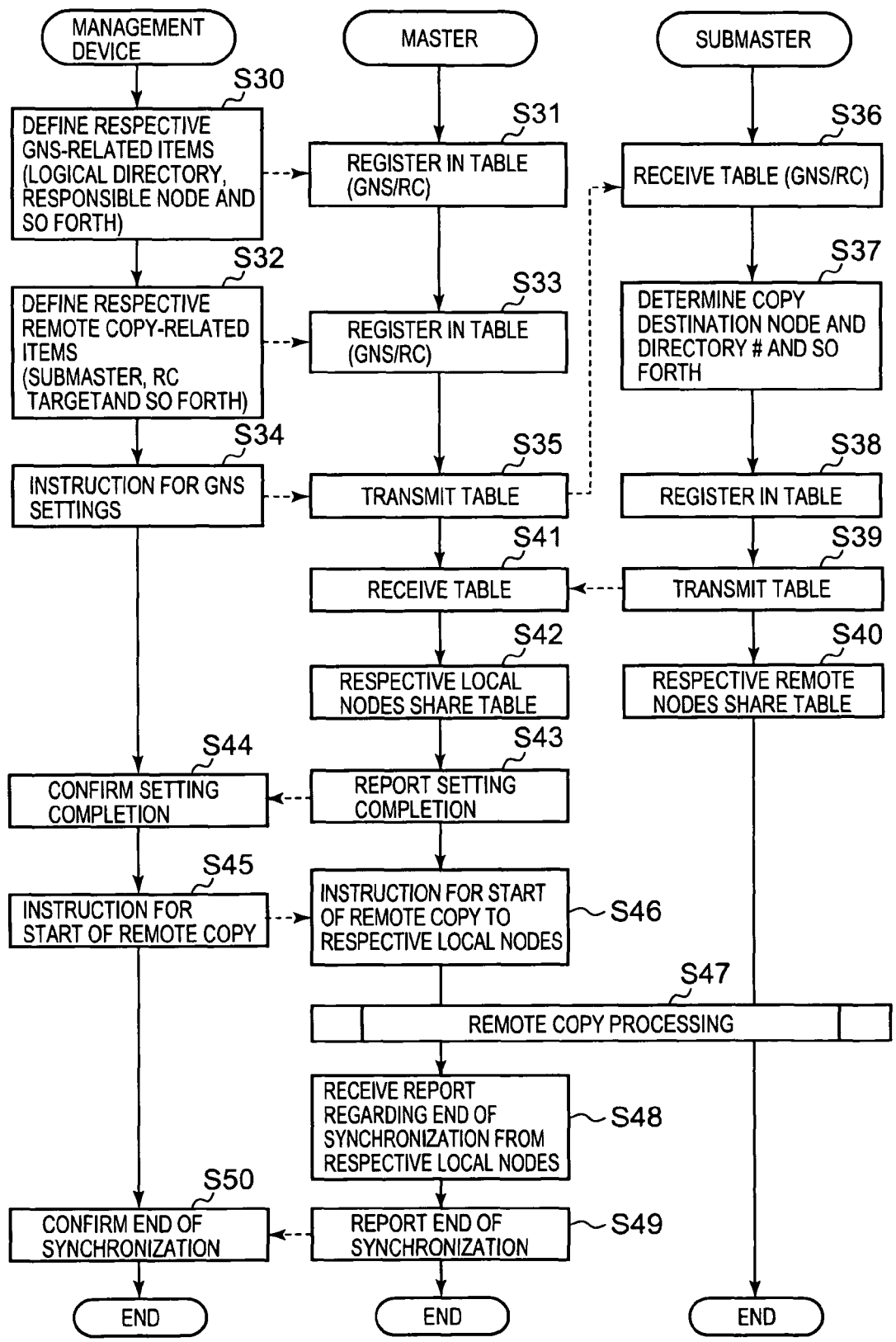
FIG. 10 is a flowchart showing the processing for storing a table that manages a logical directory and remote copy for each node.

FIG. 10 is a flowchart showing the processing that serves to define management table T10 for controlling the architecture of the logical directory (GNS) and remote copies and which serves to share the management table T10 with the respective nodes 30.

The user uses the management device 50 to define each of the respective items C11 to C13 relating to the logical directory in the management table T10 in the master node (S30). The master node registers a value defined by the user in the management table T10 (S31). Likewise, the user uses the management device 50 to define respective remote copy-related items C14 and C15 in the management table T10 in the master node (S32). The master node registers the value defined by the user in the management table T10 (S33).

The user indicates the GNS settings (S34) 'GNS settings' signifies the fact that the content of the management table T10 is reflected in all the nodes. Therefore, the master node transmits the management table T10 to the submaster node (S35).

Upon receipt of the management table T10 from the master node (S36), the submaster node determines the copy destination node and directory number or the like (S37) and registers same in the management table T10 (S38). Here, the submaster node is able to determine remote node and directory number for copying data from the local node on the basis of the spare capacity of the volumes 123, the processing performance of the respective remote nodes, and the forecast load or the like when the remote node is used as the copy destination node, for example. Alternatively, the constitution may be such that the user determines the remote node associated with the local node manually.

The submaster node transmits the management table T10 for which the addition of the copy destination node and so forth is complete to the master node (S39). In addition, the submaster node transmits the completed management table T10 to the respective remote nodes and causes the same management table T10 to be shared by the respective remote nodes (S40).

Upon receipt of the management table T10 from the submaster node (S41), the master node transmits the management table T10 to the respective local nodes and causes the same management table T10 to be shared by the respective local nodes (S42). As a result, because the management table T10 is distributed to all of the nodes in the system, the master node reports the fact that the setting of the management table T10 is complete to the management device 50 (S43).

Upon confirmation of the setting completion (S44), the management device 50 indicates the start of the remote copy to the master node (S45). As indicated earlier, the management table T10 also contains information related to a remote copy irrespective of information related to the architecture of the logical directory and, therefore, a remote copy can be started following completion of the management table T10.

The instruction to start the remote copy issued by the management device 50 is reported by the master node to the respective local nodes and remote copy processing is started at each of the local nodes and the remote nodes forming the copy pairs (S47).

If all the remote copies between the respective local nodes and remote nodes forming the copy pairs are complete, the data in the local site 10 and the data in the remote site 20 are synchronized for the copy target data. All of the data in the local site 10 may be copied to the remote site 20 as the copy target and the data for which a copy is not required can be excluded from the remote copy target.

Upon receipt of a report to the effect that data from the respective local nodes are synchronized (S48), the master node reports the fact that the synchronization of the data is complete to the management device 50 (S49). The management device 50 confirms that the data synchronization processing is complete (S50). The above synchronization processing is implemented by a remote-copy initial copy or the like, for example.

Figure 11:
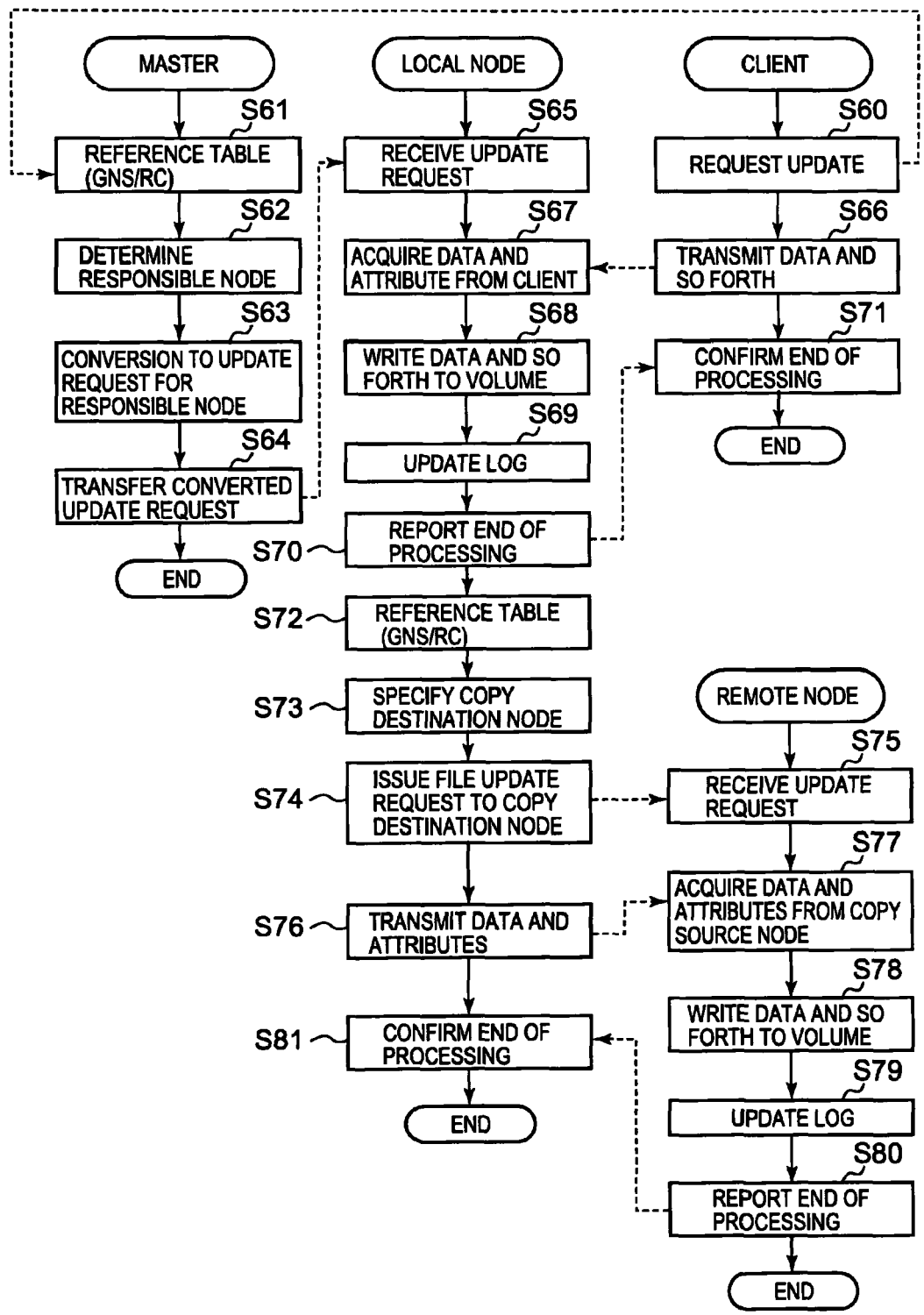
FIG. 11 is a flowchart showing file access request processing.

FIG. 11 is a flowchart showing normal file access processing. If the client 60 issues an update request (that is, a write access) (S60), the update request is received by the master node.

The master node uses the management table T10 to specify the responsible node that is to process the update request (S62). The master node converts the update request from the client 60 into an update request addressed to the responsible node (S63) and transfers the converted update request to a responsible node (S64).

Upon receipt of an update request from the master node (S65), the responsible node (which is the local node in FIG. 11) reports the fact that processing is possible to the client 60. The client 60 transmits write data and attributes that are to be simultaneously updated to the responsible node (S66) and the responsible node receives the write data and so forth (S67).

The responsible node writes write data and attributes received from the client 60 to the volume 123 (S68) and updates a log (S69). This log is for managing the file access history. The responsible node reports the fact that update request processing is complete to the client 60 (S70).

Thereafter, the responsible node references the management table T10 (S72) and specifies the node to which the write data are to be transferred (copy destination node) (S73). The responsible node issues a file update request to the copy destination node (S74). Upon receipt of the update request from the copy source node (S75), the copy destination node reports the fact that update request processing is possible. As a result, the copy source node transmits write data and attributes to the copy destination node (S76) and the copy destination node receives write data and so forth (S77) and writes same to the volumes 123 in the remote site 20 (S78).

The copy destination node (copy destination remote node) updates the log after writing write data and so forth to the volume 123 (S79) and reports the end of processing to the copy source node (S80). The copy source node confirms the fact that the remote copy is complete (S81).

Figure 12:
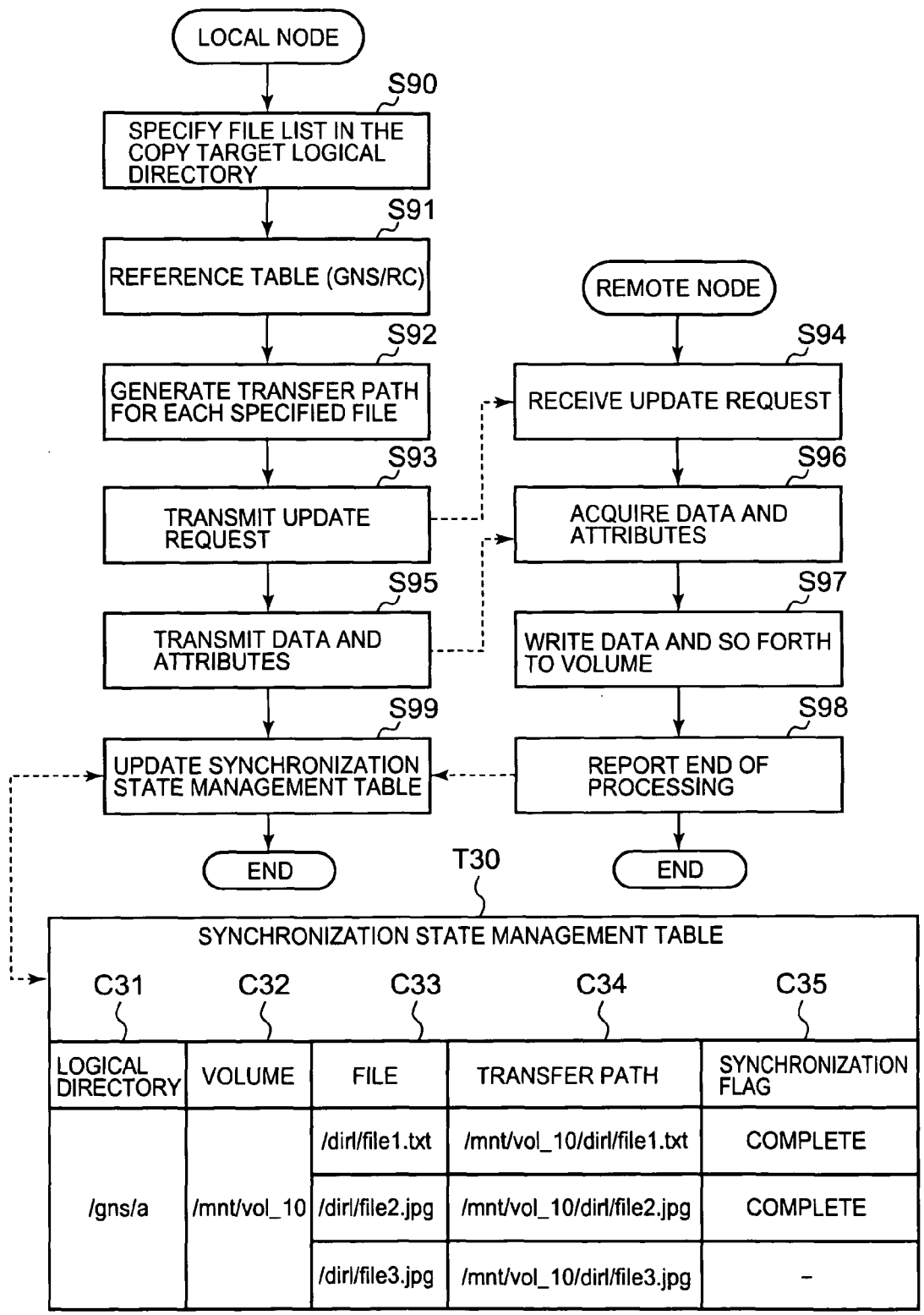
FIG. 12 is a flowchart showing the details of the processing indicated by S47 in FIG. 10.

FIG. 12 is a flowchart showing the details of the remote copy processing indicated in S47 in FIG. 10. The local node constituting the copy source node specifies the list of files that are preset as the copy target (S90). The local node references the management table T10 (S91) and generates a transfer path for each file of the copy target (S92).

The local node uses the respective transfer paths to transmit update requests, data, and attributes to the remote node constituting the copy destination node (S93, S95). Upon receipt of the update request and data and so forth from the local node (S94, S96), the remote node writes data to the directories registered in the copy destination entity position field C15 in the management table T10 and reports the end of processing to the local node (S98).

Upon receipt of the processing end report from the remote node, the local node updates a synchronization state management table T30 (S99). The synchronization state management table T30 is a table for managing the progressive state of the initial copy.

The synchronization state management table T30 associates and manages, for example, a field C31 indicating the directory name of the logical directory, a field C32 indicating the position in which the data of the directory are actually stored, a field C33 indicating the files included in the directory, a field C34 indicating the path for transferring the files;

and a field C35 indicating whether file synchronization is complete. By managing whether synchronization is complete for each file of the copy target, remote copy processing can be run in parallel while processing a file access request from client 60.

Figure 13:
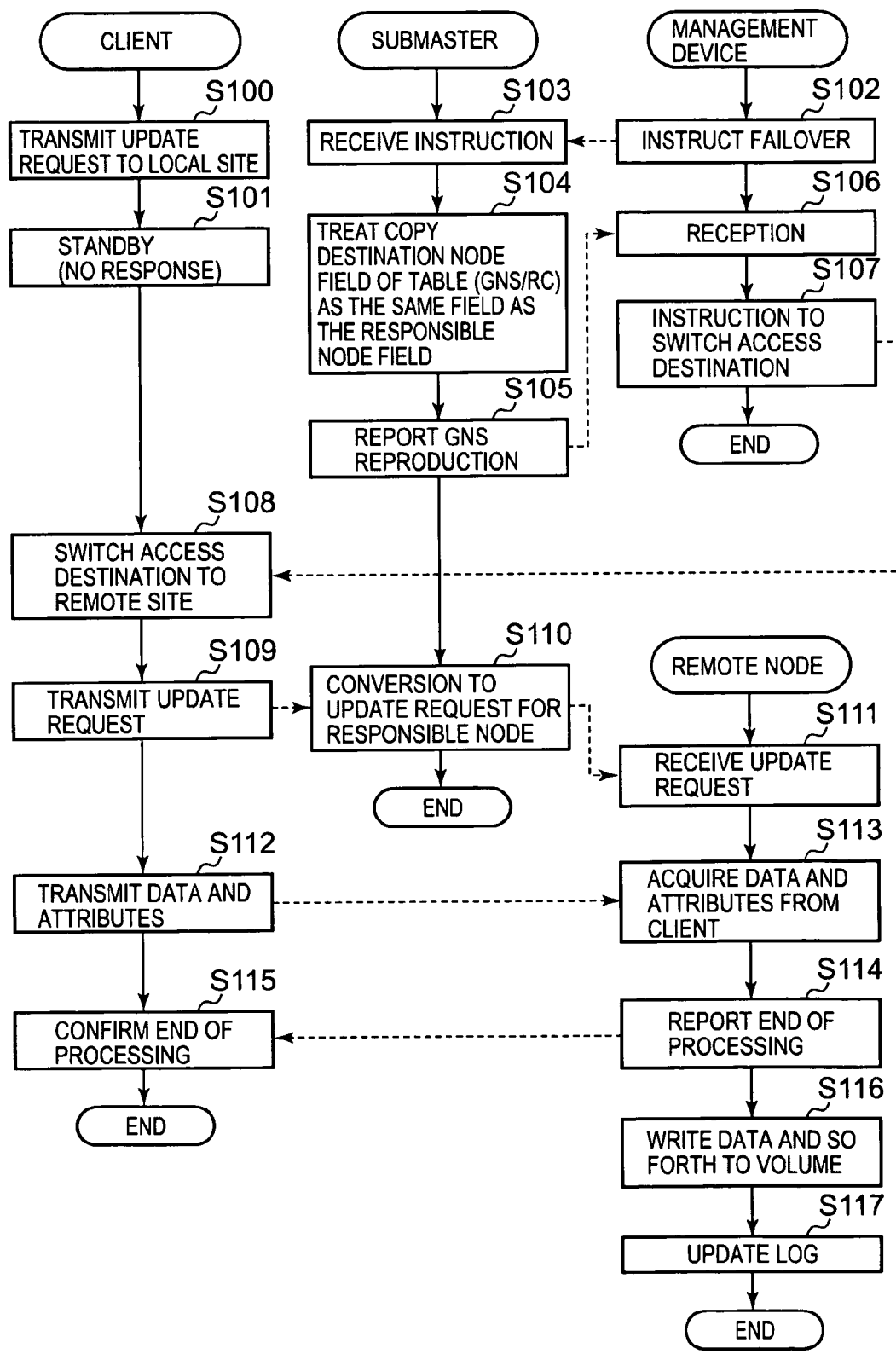
FIG. 13 is a flowchart showing disaster recovery processing.

FIG. 13 is a flowchart showing disaster recovery processing. A case where the local site 10 has stopped due to a disaster or the like is assumed. Because a response to the effect that processing is possible is sent back from the local node even when the client 60 issues an update request to the local node (S100), the client 60 awaits processing (S101).

A user who is anxious about stoppage of the local site 10 issues a clear instruction for a failover to the submaster node from the management device 50 (S102). Upon receipt of this instruction (S103), the submaster node reproduces the logical directory at the remote site 20 by treating the copy destination node field C14 of the management table T10 as the 'responsible node field C12' and the entity position field C15 as the entity position field C13 (S104) and reports the fact that the logical directory is reproduced to the management device 50 (S105).

Upon confirming reproduction of the logical directory (S106), the management device 50 instructs the switching of the access destination to the client 60 (S107). As a result, client 60 switches the access destination from the local site 10 to the remote site 20 (S108).

If the client 60 issues an update request to the remote site 20 (S109), the submaster node specifies the responsible node that is to process the update request and converts the update request into an update request that is addressed to the responsible node (S110). Upon receipt of the converted update request (S111), the responsible node reports the fact that processing is possible to the client 60. As a result, the client 60 transmits the write data and attributes to the responsible node (S112).

Upon receipt of the write data and attributes from the client 60 (S113), the responsible node reports the fact that the update processing is complete to the client 60 (S114). As a result of this report, the client 60 confirms the fact that the update processing is complete (S115). The responsible node writes the write data and attributes received from the client 60 to the volume 123 and updates the log (S117).

This embodiment which is so constituted affords the following effects. According to this embodiment, by performing a remote copy between the local site 10 and remote site 20, the data between the two sites 10 and 20 are synchronized and, in cases where a fault occurs at the local site 10, the logical directory can be reproduced in the remote site 20. Therefore, a logical directory 8 with an improved fault tolerance can be provided even in cases where the constitutions of the physical resources differ between the respective sites 10 and 20.

In this embodiment, by using the management table T10 that integrates the GNS management information and copy management information and treating part of the copy management information as part of the GNS management information, the logical directory can be reproduced relatively rapidly in the remote site 20.

In other words, in this embodiment, by integrating management information for constructing the logical directory and management information for performing a remote copy, the remote copy management information can be used for the reproduction of the logical directory. Hence, in this embodiment, there is no need to especially prepare information for re-constructing the logical directory at the remote site 20, the memory resources of the respective nodes 30 can be utilized effectively, and the logical directory can be re-constructed using relatively simple control. As a result, the fault tolerance of the file sharing system improves and user convenience improves.

Second Embodiment

A second embodiment of the present invention will now be described on the basis of FIGS. 14 to 23. The respective embodiments that appear hereinbelow correspond to modified examples of the first embodiment. In this embodiment, data synchronization between the local site 10 and remote site 20 is implemented by means of a remote copy between the storage devices 100. Descriptions that duplicate those for the first embodiment will be omitted hereinbelow and the description will focus on the parts that differ from those of the first embodiment.

Figure 14:
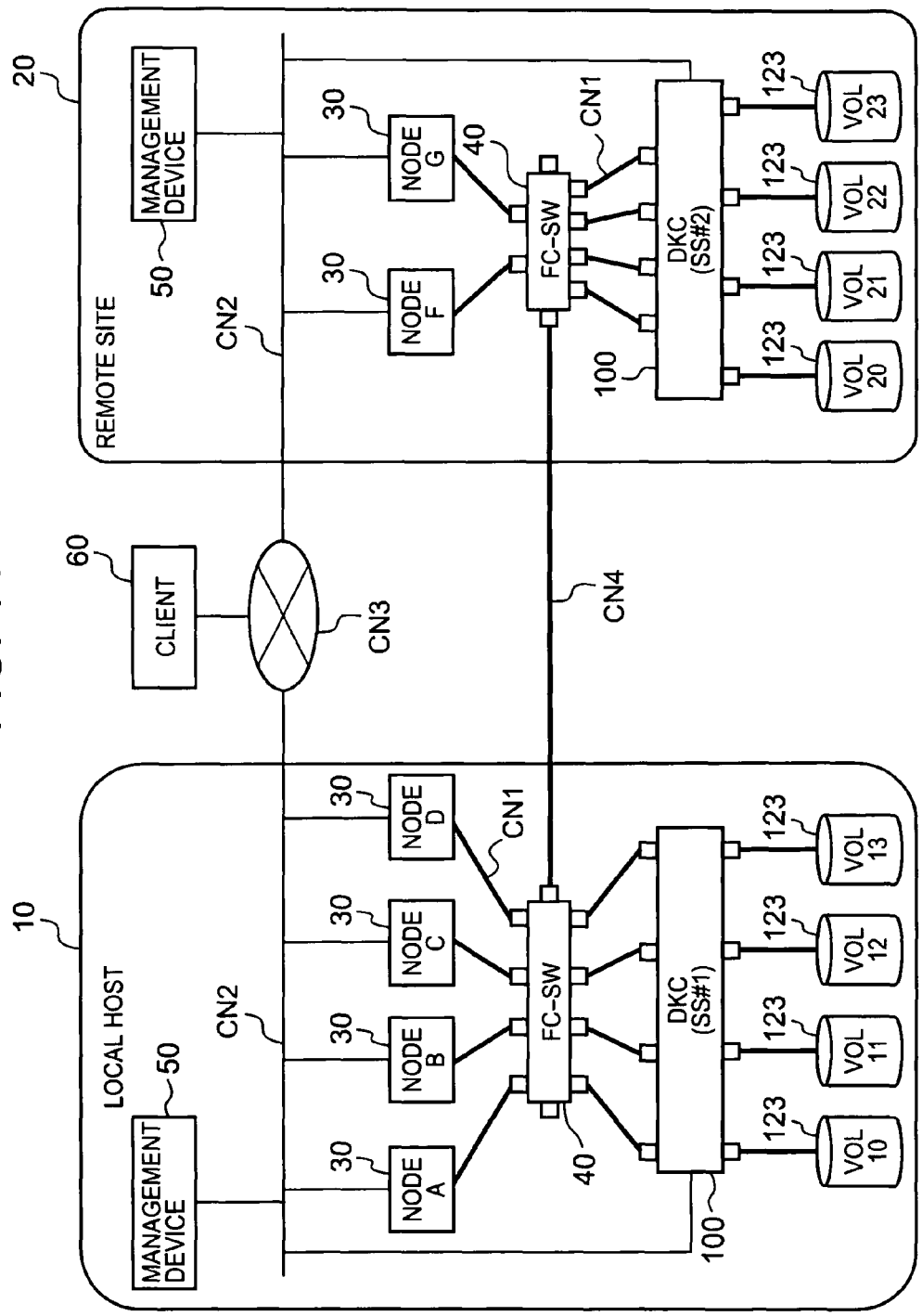
FIG. 14 is an explanatory diagram showing the overall constitution of the file sharing system according to a second embodiment.

FIG. 14 is an explanatory diagram of the overall constitution of the file sharing system according to this embodiment. The storage device 100 in the local site 10 and the storage device 100 in the remote site 20 are connected via an inter-site communication network CN4 which constitutes the 'second communication path'.

Figure 15:
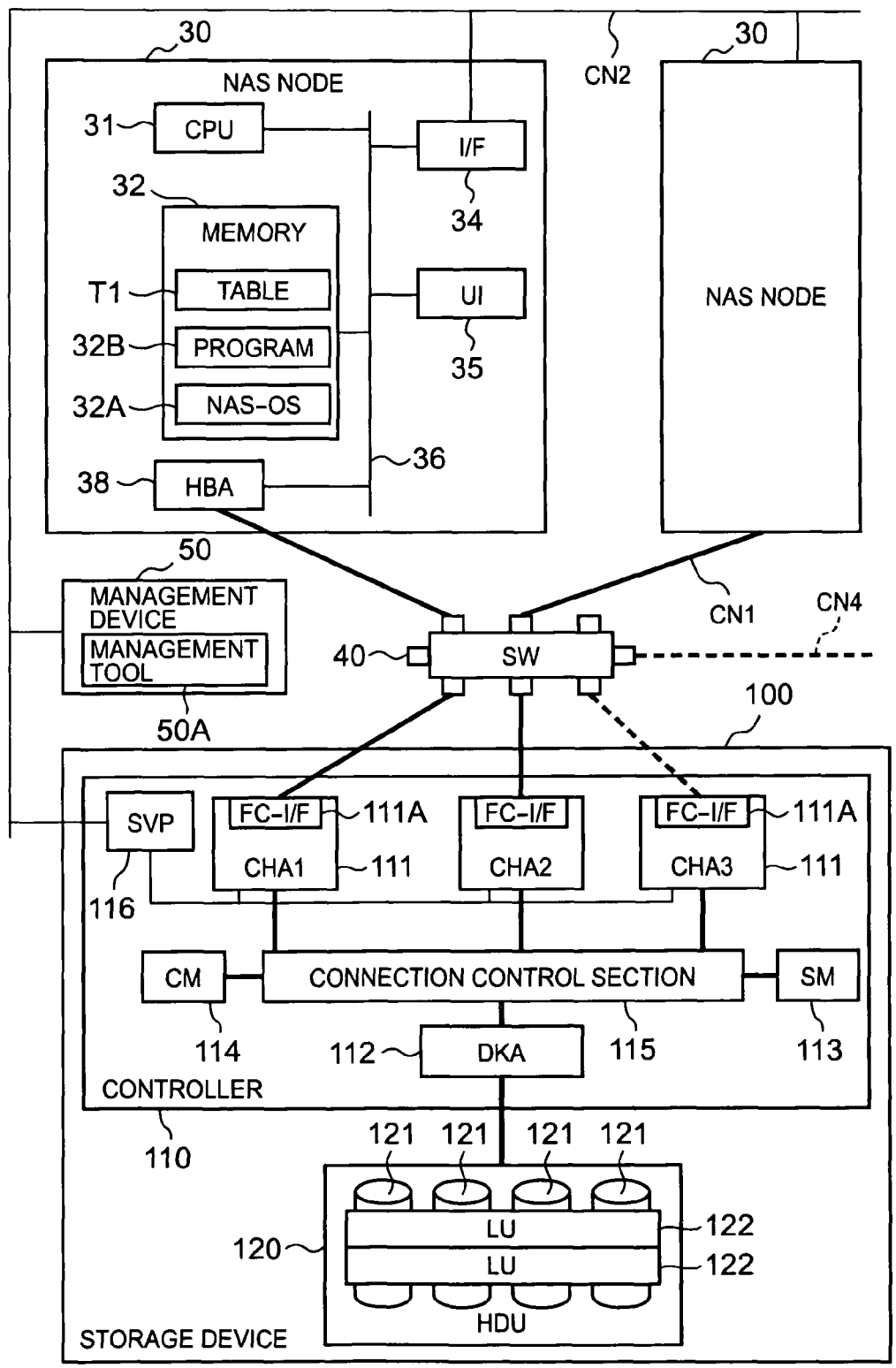
FIG. 15 is an explanatory diagram showing the constitution in one site.

FIG. 15 is an explanatory diagram showing the detailed constitution within one site. If we focus on the storage device 100 in this embodiment, the CHA111 shown on the middle right of FIG. 15 is connected to the storage device 100 in another site via the communication network CN4. In this embodiment, a block-unit remote copy is performed to synchronize the data asynchronously with respect to the processing of the file access request that is executed by the NAS node 30.

Figure 16:
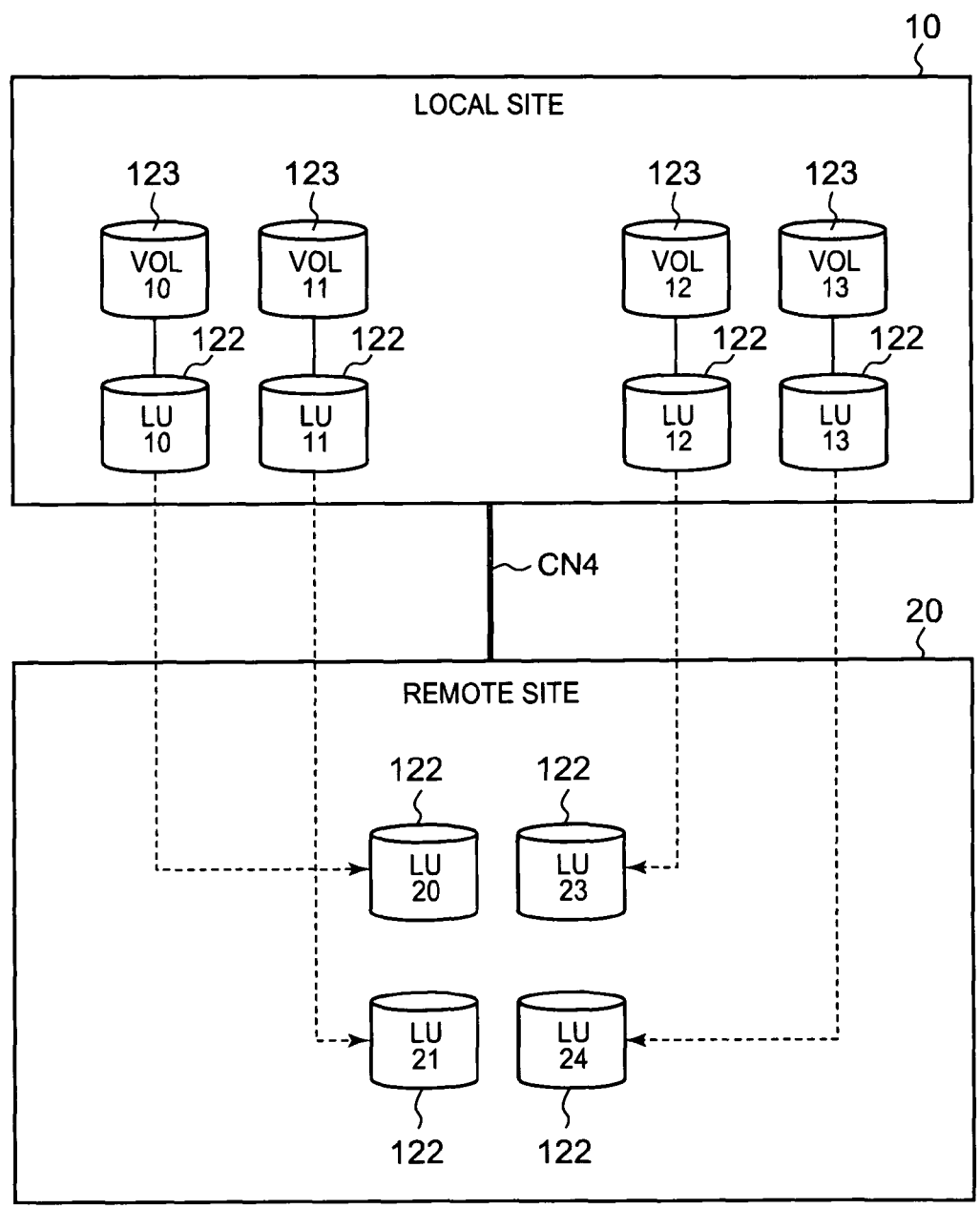
FIG. 16 is an explanatory diagram showing the relationship between a copy source logical device and a copy destination logical device.

FIG. 16 is an explanatory diagram that shows an aspect of a copy pair for performing a block-unit remote copy between volumes (between logical devices). The logical device (copy source logical device) 122 that corresponds to the respective copy source volumes 123 in the local site 10 forms a copy pair with the logical device (copy destination logical device) 122 that corresponds with the respective copy destination volumes in the remote site 20.

Figure 17:
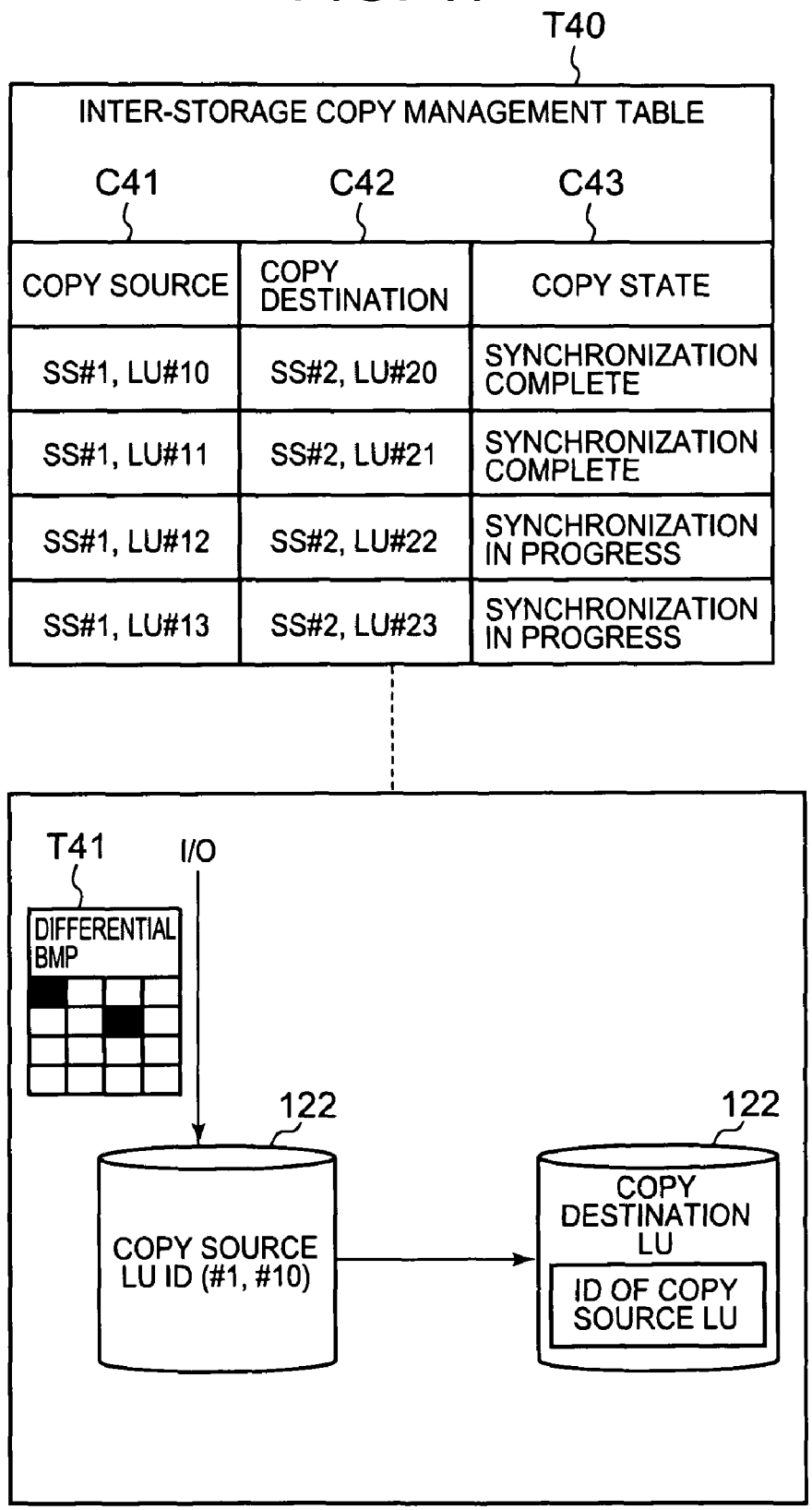
FIG. 17 is an explanatory diagram of a table for controlling a remote copy that is executed between storage devices.

FIG. 17 indicates an inter-storage copy management table T40 that is used to perform a remote copy between storage devices 100. This copy management table T40 can be stored in the shared memory 113 or cache memory 114 of the storage device 100, for example. The copy management table T40 is held by both the storage device 100 in the local site 10 and the storage device 100 in the remote site 20.

The management table T40 comprises, for example, a copy source logical device field C41, a copy destination logical device field C42, and a copy state field C43. The copy source logical device and copy destination logical device are each specified by means of a combination of the device number identifying the respective storage devices 100 ('SS#' in Figs.) and the logical device number for identifying the respective logical devices 122 ('LU#' in Figs.) in C41 and C42. Information indicating a state reflecting whether synchronization is in progress is set in C43.

As shown in the lower part of FIG. 17, an update request can also be managed by means of a differential bitmap T41 during a remote copy or after a remote copy is complete. For example, by recording the position of the update request that occurs after the end of the initial copy in the differential bitmap T41, only the differential data can be transferred in cases where the copy source logical device and the copy destination logical device are re-synchronized.

Further, as shown in the lower part of FIG. 17, identification information for identifying the copy source logical device (ID) can be stored in an area for storing management information in the copy destination logical device. This ID is constituted by combining the device number (SS#) of the storage device 100 in which the copy source logical device is provided and the device number (LU#) of the copy source logical device, for example.

FIG. 18 shows a management table T10A for GNS and remote copies which is used in this embodiment. In this embodiment, the entity positions C13A and C15A are provided in addition to each of the items described in the management table T10. The device number of the storage device 100 and the device number of the logical device are set as the entity positions C13A and C15A.

Figure 19:
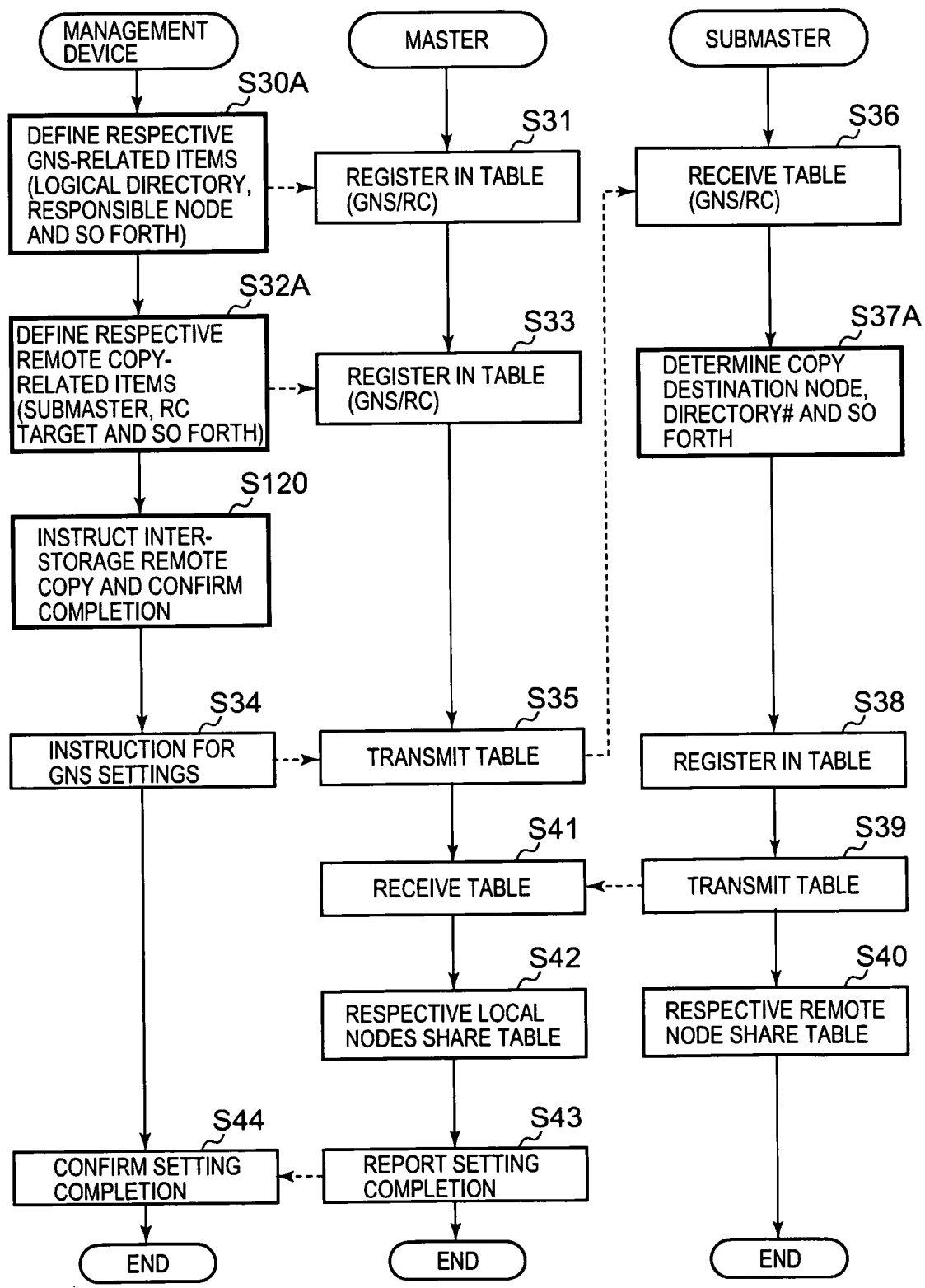
FIG. 19 is a flowchart showing the processing for reporting the management table to each node.

FIG. 19 shows the processing for setting the management table T10A. In S30A and S32A, the generation of a logical directory and remote copy-related settings are input to the management table T10A from the management device 50. In S37A, which is executed by the submaster, the positions of copy destinations nodes and entities are added to the management table T10. The management device 50 issues an instruction to start the remote copy to the storage device 100 in the local site 10 with predetermined timing (S120). In the following description, the storage device 100 in the local site 10 is sometimes referred to as the local storage device and the storage device 100 in the remote site 20 is sometimes called the remote storage device.

Figure 20:
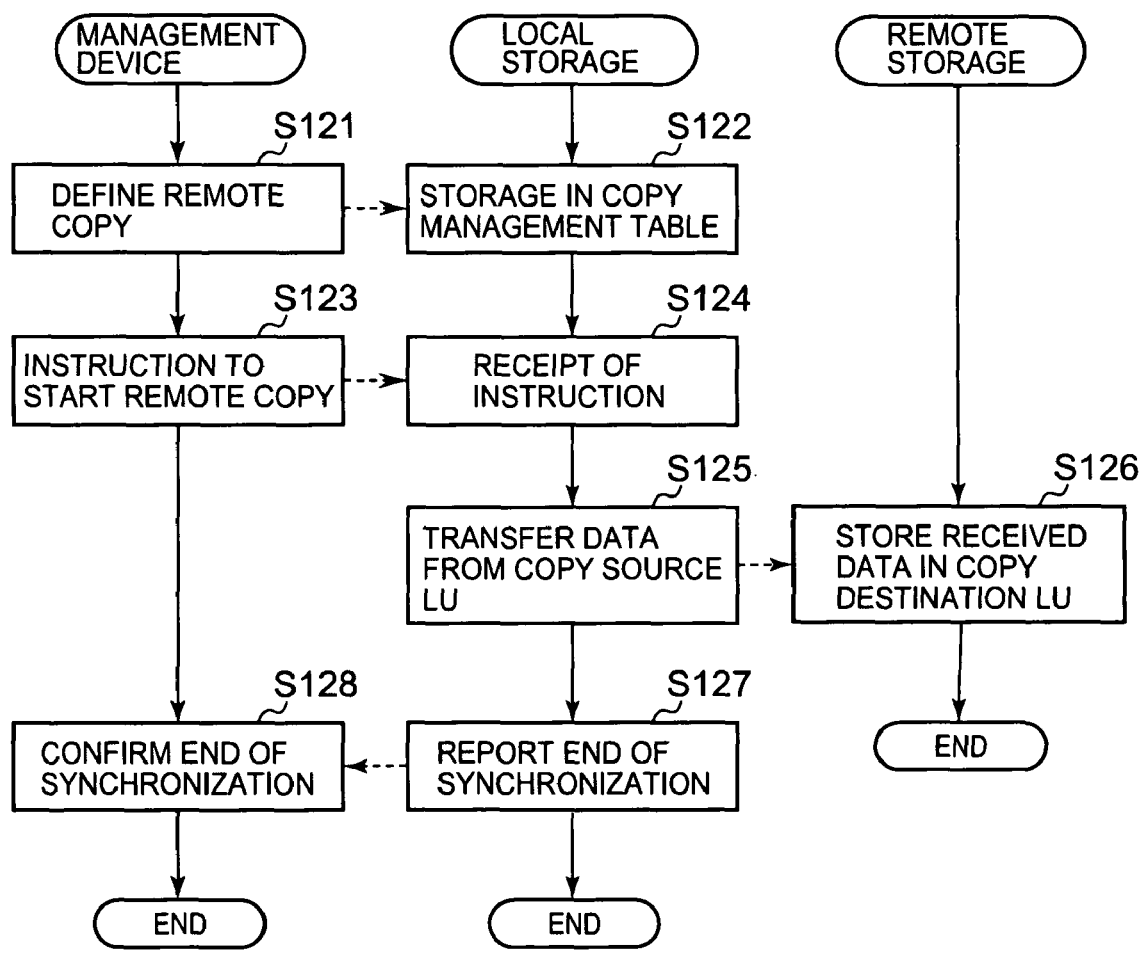
FIG. 20 is a flowchart showing remote copy processing between storage devices.

FIG. 20 is a flowchart showing the block-unit remote copy processing that is executed between the storage devices 100. The remote copy processing is executed asynchronously with respect to the file access request processing of the NAS nodes 30.

Steps appearing in FIG. 19 are included in FIG. 20 for the sake of understanding. The management device 50 makes remote copy-related settings with respect to the local storage device (S121). The local storage device registers the values input from the management device 50 in the inter-storage copy management table T40 (S122).

The management device 50 issues an instruction to start a remote copy (S123) and, when the local storage device receives this instruction (S124), the local storage device starts a remote copy on the basis of the content of the copy management table T40. In other words, data are transmitted in block units from the copy source logical device to the copy destination logical device (S125). The remote storage device stores block data that are received from the local storage device in the copy destination logical device (S126).

If a data copy from the copy source logical device to the copy destination logical device is complete, the local storage device reports the fact that the synchronization of data is complete to the management device 50 (S127) and the management device 50 confirms the fact that the synchronization of data is complete (S128).

Figure 21:
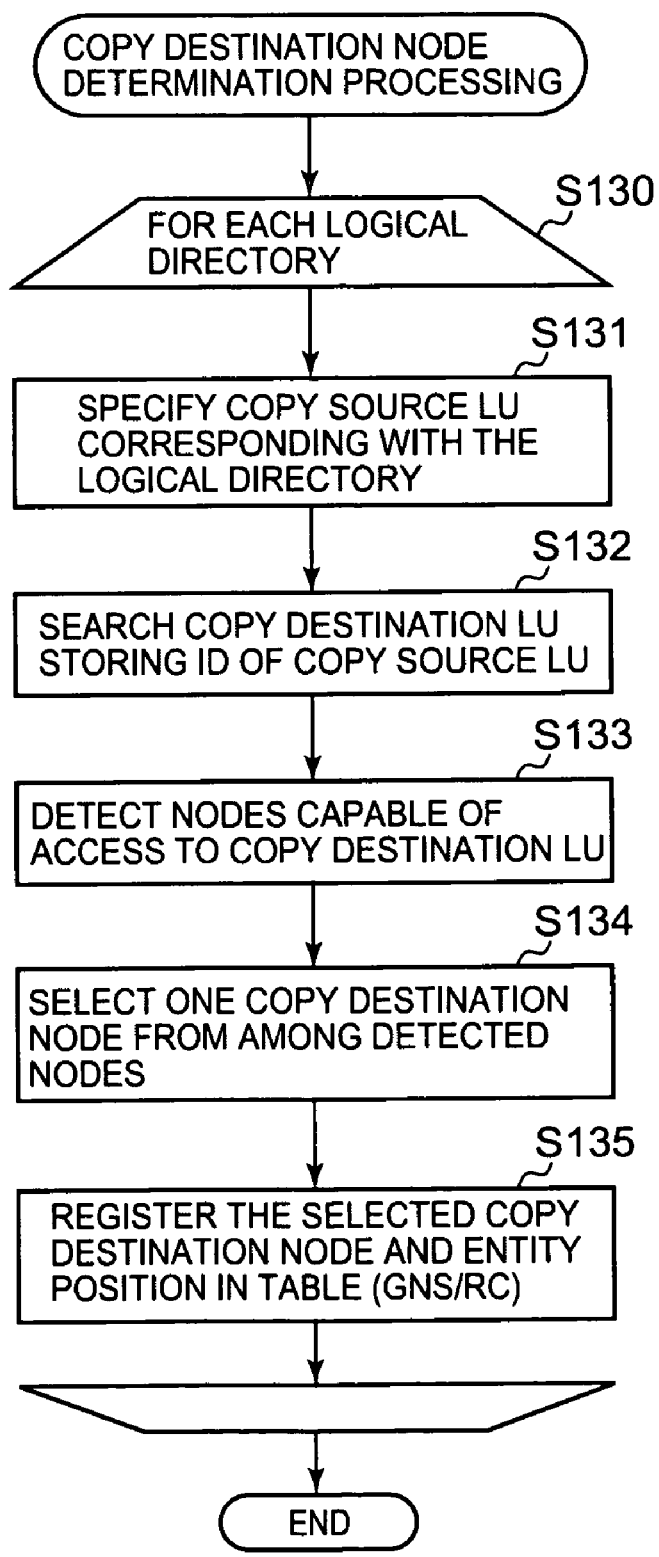
FIG. 21 is a flowchart showing the details of the processing indicated by S37A in FIG. 19.

FIG. 21 is a flowchart showing an example of the steps to determine the copy destination node indicated in S37A in FIG. 19. This processing is executed for each directory corresponding to the node name of the respective logical directories (S130).

The submaster node specifies the copy source logical device that corresponds to the processing-target directory by using the management table T10A (S131). The submaster node finds a copy destination logical device that stores the ID of the copy source logical device by searching the management information storage area of the respective logical devices 122 in the remote storage device (S132).

The submaster node detects the remote node that is able to access the copy destination logical device thus found (S133) and selects one copy destination node from among the detected remote nodes in accordance with the expected load and so forth (S134). The submaster node registers the selected copy destination node in the management table T10A (S135). The submaster node registers the 'entity position' and directory number for accessing the copy destination logical device found via the selected copy destination node in the management table T10A (S135).

Figure 22:
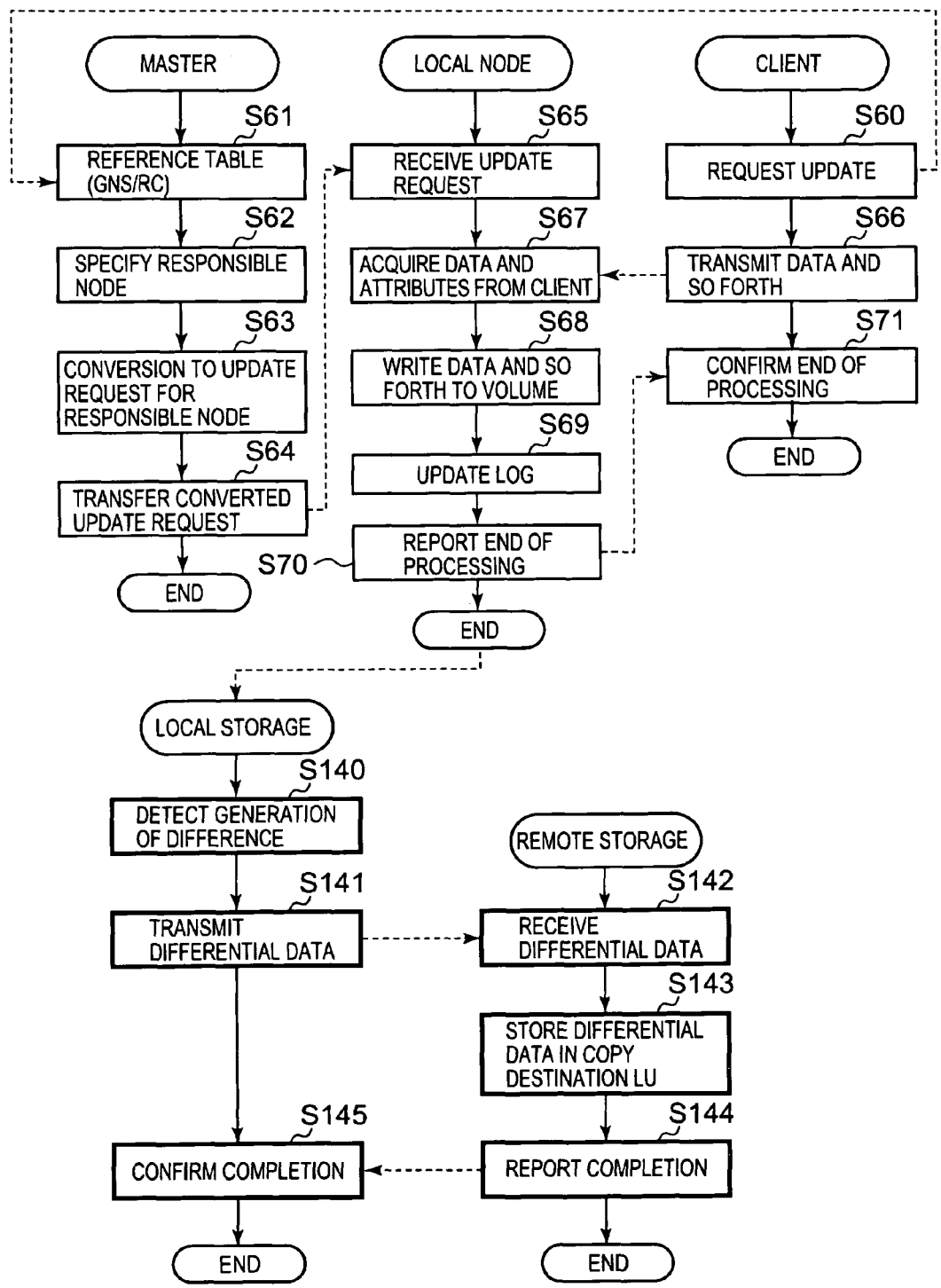
FIG. 22 is a flowchart showing processing for copying differential data between storage devices.

FIG. 22 shows the processing to transmit the differential data generated following completion of the data synchronization between the storage devices 100 from the local storage device to the remote storage device. The local node processes a file access request from the client 60 basically extraneously from the operation of the storage device 100. As a result, a difference arises between the data stored in the local storage device and the data stored in the remote storage device. This difference is managed by the differential bitmap T41.

Upon detection of the occurrence of differential data (S140), the local storage device transmits the differential data to the remote storage device (S141). The remote storage device receives the differential data (S142) and stores same in the copy destination logical device (S143). As a result of a report from the remote storage device (S144), the local storage device confirms that the differential data have been written to the copy destination logical device (S145).

For the sake of convenience, S141 and subsequent steps were described as being executed once the differential data have been generated in S140. However, the start of the execution of these steps is not limited to such a condition. The start of differential data copying may also be triggered when a predetermined amount of differential data has been accumulated or when a predetermined time has elapsed since the transfer of the previous differential data, for example.

Figure 23:
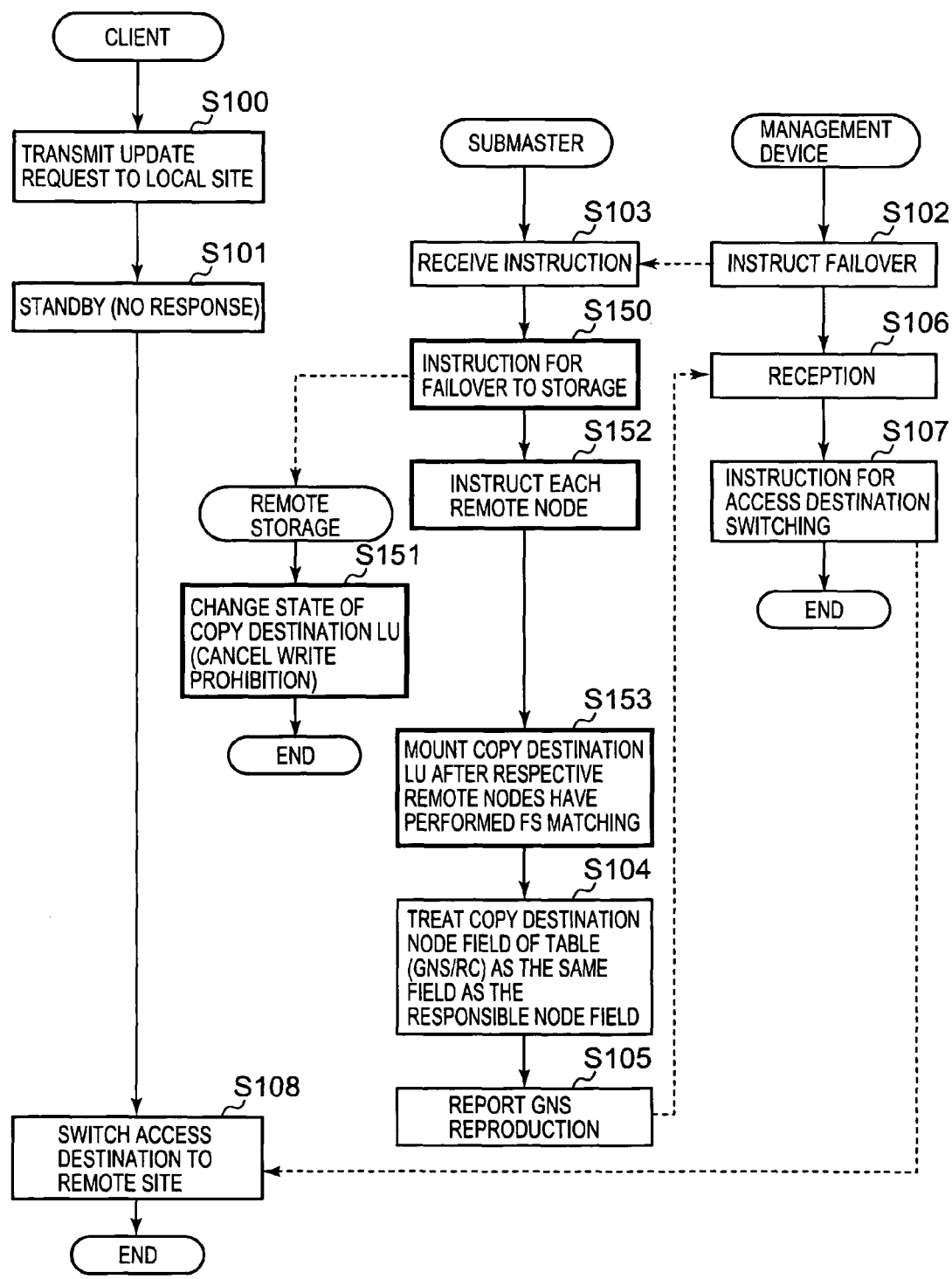
FIG. 23 is a flowchart showing disaster recovery processing.

FIG. 23 is a flowchart showing the disaster recovery processing. Upon receipt of a failover start instruction from the management device 50 (S103), the submaster node issues an instruction to start the failover to the remote storage device (S150). The remote storage device executes the processing required for the failover (S151). As the processing required for the failover, processing to establish a readable/writable state by rewriting the access control information set for the copy destination logical device can be cited by way of example.

The submaster node issues an instruction to start the failover to the respective remote nodes (S152) and mounts the volume corresponding to the copy destination logical device on the remote node (S153). Here, the respective remote nodes perform fail system ('FS' in FIG. 23) matching prior to mounting the volume. A command for checking the fail system such as a a fsck command, for example, is used in the fail system matching.

This embodiment so constituted affords the same effects as those of the first embodiment. In addition, because a block-unit remote copy is performed between the storage devices 100 in this embodiment, the load on the respective NAS nodes 30 constituting the copy source or copy destination can be alleviated, whereby the response performance of the file sharing system can be increased.

Third Embodiment

Figure 24:
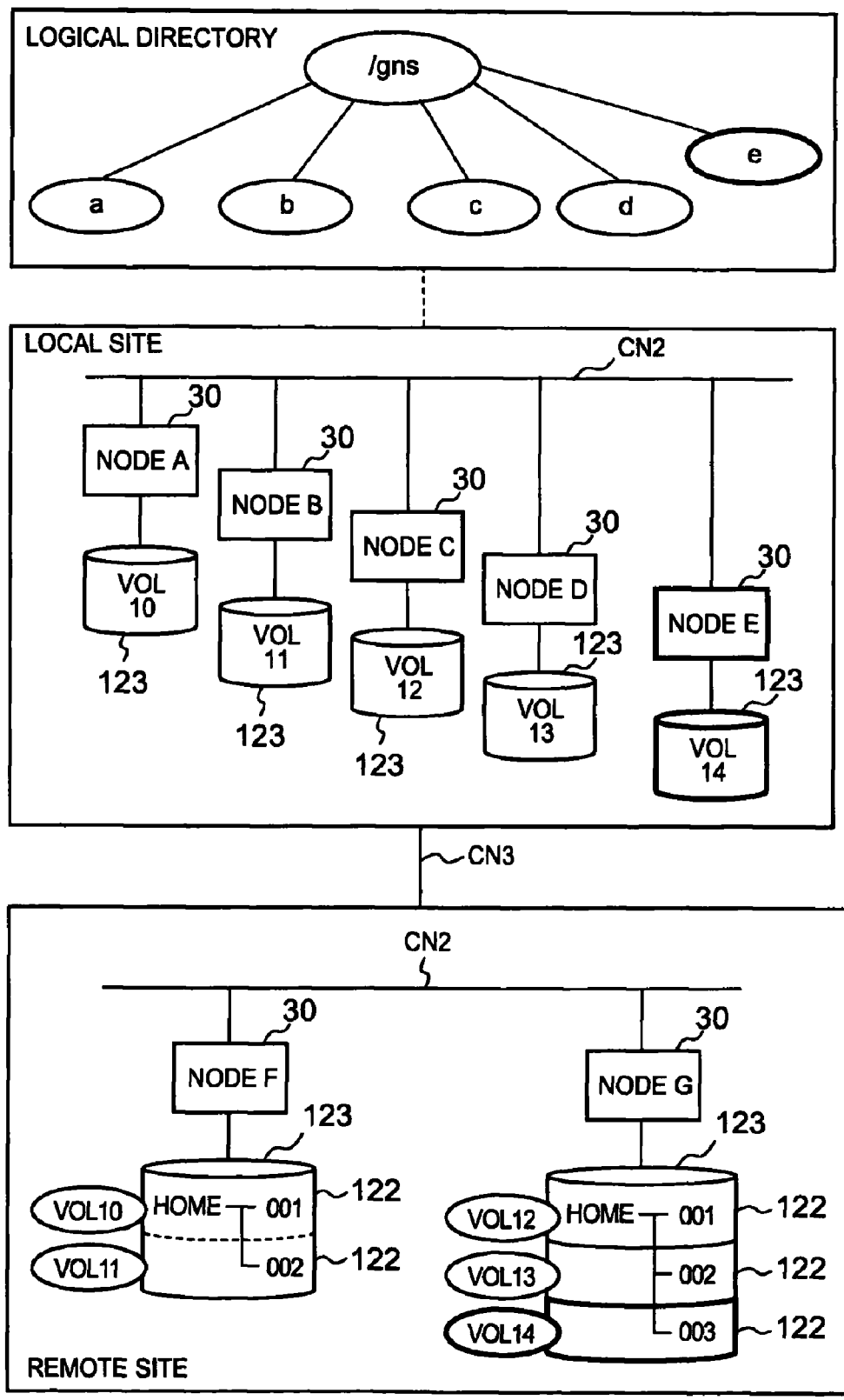
FIG. 24 is an explanatory diagram showing an aspect in which the constitution of a local site is changed by a file sharing system according to a third embodiment.

A third embodiment will now be described based on FIGS. 24 and 25. In this embodiment, a correspondence method in a case where the constitution of the local site 10 is changed will be described. As shown in FIG. 24, a case where a new directory '/e' is added to the logical directory and where a new local node 30 (E) which corresponds with the new directory is added to the local site 10 is given by way of example. The file group managed by the newly added local node 30 (E) is copied to the remote node 30 (G) in the remote site 20.

Figure 25:
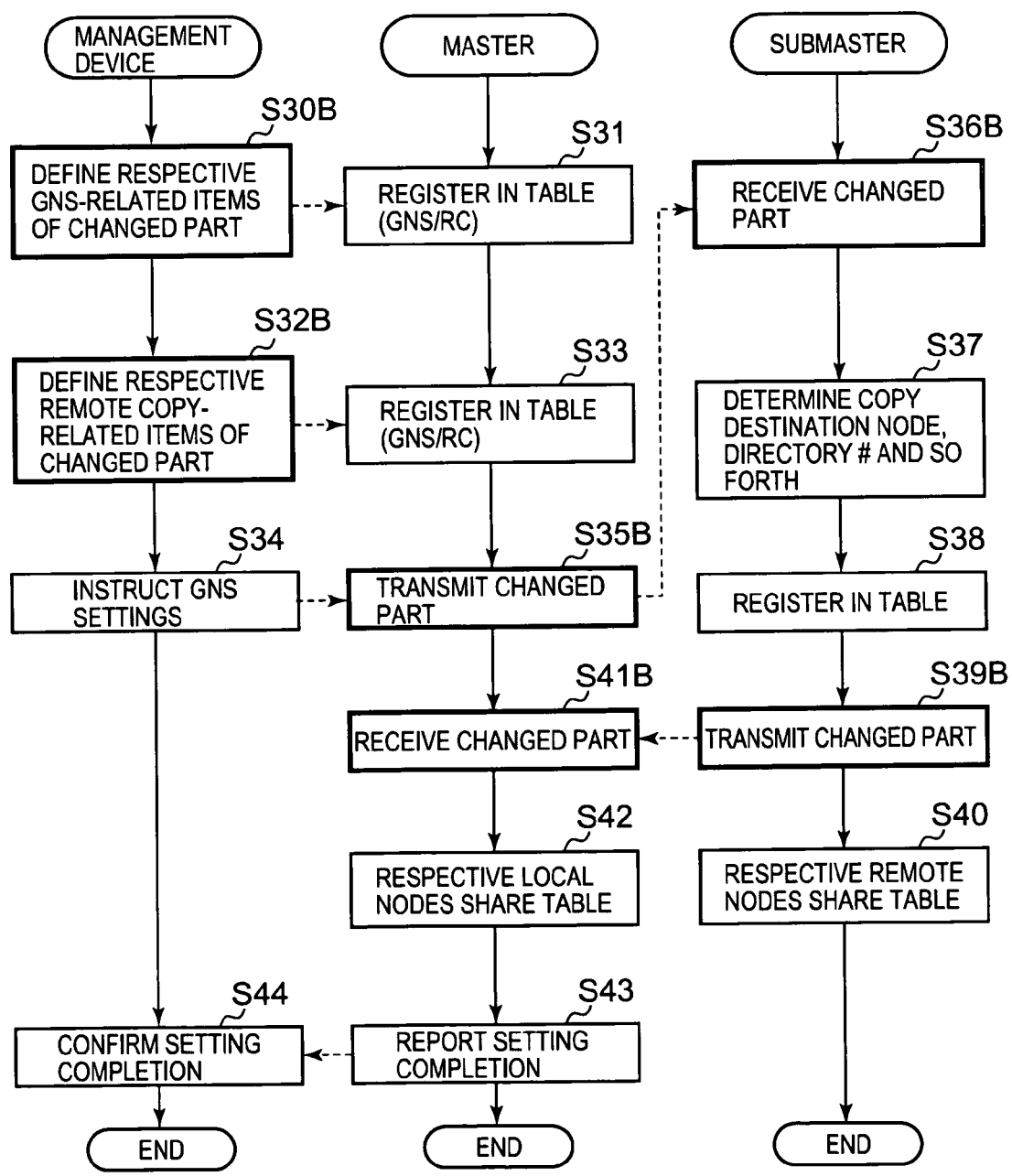
FIG. 25 is a flowchart showing processing to reflect changes in the constitution of the local site in the management table in each node.

FIG. 25 is a flowchart showing processing that serves to reflect changes to the constitution in the local site 10 in the management table T10 in the respective nodes 30. This processing can be carried out by utilizing processing to hold the management table T10 in all of the nodes. The management device 50 defines the respective GNS-related items of the changed part (S30B) and the master node records same in the changed (added) record (S31). Likewise, the management device 50 defines the respective remote copy-related items of the changed part (S32B) and the master node adds same to the changed (added) record (S33).

The master node transmits a changed part record in the management table T10 to the submaster node (S35B). Upon receipt of the changed part record (S36B), the submaster node determines a copy destination node or the like that corresponds to the changed part and adds same to the record (S37, S38) and transmits the changed part record to the master node (S39B).

Thus, in this embodiment, in cases where the constitution of the local site 10 is changed, the content of the management table T10 held in each node 30 can be updated simply by reporting only the record for parts related to the change to the respective nodes 30. Further, although a description is omitted, only the record for the changed part need be transmitted to the respective nodes 30 of the system constitution management table T20 as above.

Fourth Embodiment

Figure 26:
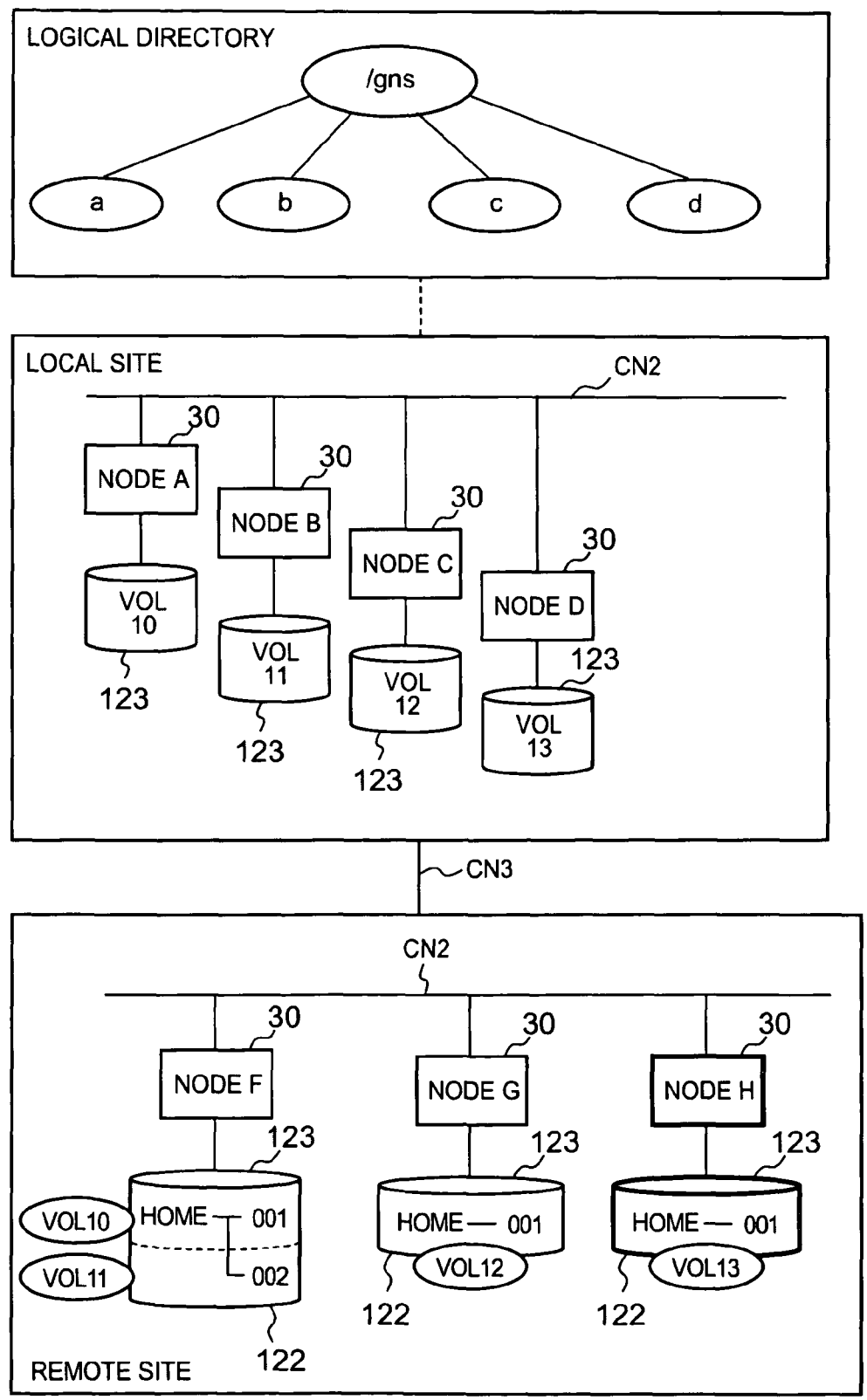
FIG. 26 is an explanatory diagram showing an aspect in which the constitution of the remote site is changed by a file sharing system according to a fourth embodiment.

A fourth embodiment will be described based on FIGS. 26 and 27. In this embodiment, a correspondence method for a case where the constitution of the remote site 20 is changed will be described. A case where a new NAS node 30 (H) is added to the remote site 20 and a volume (VOL 13) for which the node 30 (G) has been responsible thus far is moved to the node 30 (H) as shown in the lower part of FIG. 26.

Further, at the remote site, the volume (Vol 13) for which node 30 (G) is responsible can be pre-constituted by a plurality of logical devices. In cases where this volume (Vol 13) is constituted by a plurality of logical devices, some of the logical devices are able to move from the node 30 (G) to node 30 (H).

Alternatively, yet another logical device is prepared and this new logical device is temporarily allocated to node 30 (G) to move the directory data of the volume (Vol 13) to the new logical device. Further, a method where the new logical device, to which the directory data have been moved, is re-allocated to node 30 (H) is also possible.

Figure 27:
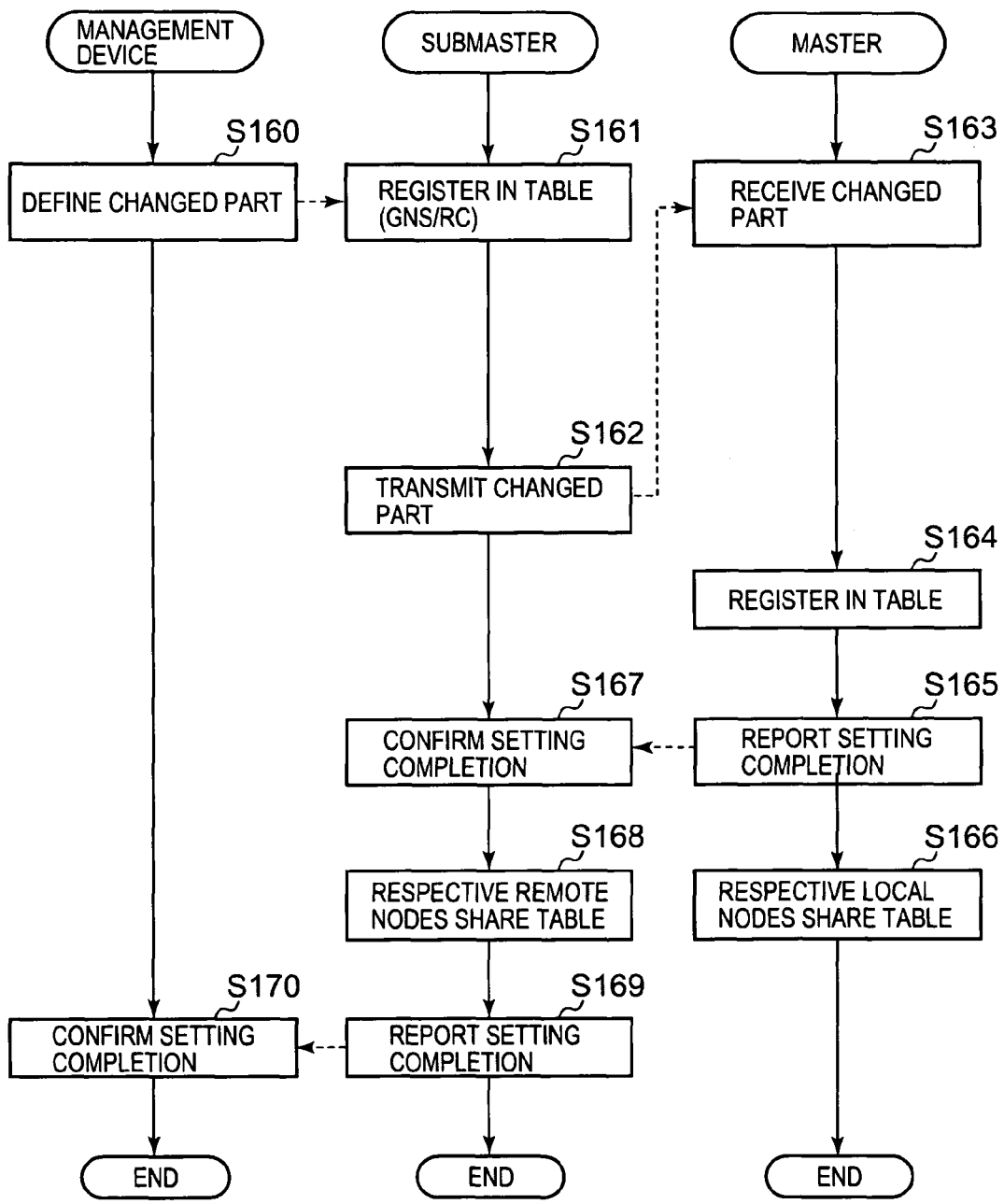
FIG. 27 is a flowchart showing processing to reflect changes to the constitution of a local site in a management table in each node.

FIG. 27 is a flowchart showing the processing to reflect a change to the constitution of the remote site in the management table T10 in each node 30. If a definition is input from the management device 50 for the changed (added) constitution (S160), the submaster node registers the definition related to the changed (added) constitution in the management table T10 (S161) and transmits only the changed part record to the master node 30 (S162).

Upon receipt of the changed part record (S163), the master node registers the changed part record in the management table T10 (S164) and reports the completion of settings to the submaster node (S165). In addition, the master node transmits the changed part record to each local node to update the management table T10 of the respective local nodes (S166).

Upon receipt of the setting completion report from the master node (S167), the submaster node transmits a changed part record to the respective remote nodes to update the management table T10 in the respective remote nodes (S168). Upon receipt of the setting completion report from the submaster node (S169), the management device 50 confirms that fact that the change to the remote site constitution has been transmitted to each node (S170).

Thus, according to this embodiment, so too in the case where the constitution of the remote site 20 is changed, as per the third embodiment, the content of the management table T10 held in each node 30 can be updated simply by reporting only the record of the change-related part to each node 30.

Further, the present invention is not limited to or by the above embodiments. A person skilled in the art is able to perform a variety of additions and modifications within the scope of the present invention.

What is claimed is:

1. A file sharing system having a first site and a second site, wherein a plurality of first file sharing devices in the first site are connected to a plurality of second file sharing devices in the second site to enable mutual communication via a first communication path, the system comprising:

a logical directory supply section, operated by a computer device, uses first management information for managing an associated relationship between a single logical directory structure that is generated across the plurality of first file sharing devices using a global name space (GNS) and a first directory structure of each first file sharing device, and supplies the single logical directory structure that is formed by virtually integrating the first directory structures of each first file sharing device to a client device, wherein the first management information includes directory names of the first directory structures, responsibility information for specifying the first file sharing devices responsible for the first directory structures and a first storage position for indicating the first storage position of the data managed by the first file sharing devices;

a copy control section, operated by a computer device, uses second management information for managing an associated relationship between the first storage positions of data managed by the plurality of first file sharing devices and second storage positions of the data managed by the plurality of second file sharing devices, and transmits and copies copy target data from the data stored in the plurality of first file sharing devices to the plurality of second file sharing devices, wherein the plurality of second file sharing devices include the data from the plurality of first file sharing devices, and wherein the second management information includes the first storage position and the second storage position of the data managed by the second file sharing devices and copy destination information, wherein the copy destination information specifies the second file sharing devices that are associated with the first file sharing devices; and a reproduction section, operated by a computer device, which reproduces the single logical directory structure by virtually integrating a second directory structure of the plurality of second file sharing devices using the first management information and the second management information and by using the copy destination information which includes the same information as the responsibility information, on a condition that a fault occurs at the first site;

wherein the first management information and the second management information are stored in a common management table that includes respective directory names of the first directory structures, the responsibility information for specifying the plurality of first file sharing devices that are each responsible for the respective directory names, the first storage position information indicating the storage position of the data managed by the plurality of first file sharing devices, the copy destination device information for specifying the plurality of second file sharing devices that correspond with the plurality of first file sharing devices, and the second storage position information indicating the storage positions of the data managed by the second file sharing devices, and wherein the reproduction section reproduces the single logical directory structure of the plurality of first file sharing devices by treating the copy destination device information as the responsibility information where a fault occurs at the first site.

2. The file sharing system according to claim 1, wherein the structure of volume used by the plurality of first file sharing devices to input and output data and the structure of the volume used by the plurality of second file sharing devices to input and output data are different.

3. The file sharing system according to claim 1, wherein the copy control section transmits and copies the copy target data from the plurality of first file sharing devices to the plurality of second file sharing device via the first communication path.

4. The file sharing system according to claim 1, wherein the plurality of first file sharing devices store and manage data in a first volume provided by a first storage device in the first site;

the plurality of second file sharing devices store and manages data in a second volume provided by a second storage device in the second site;

the first storage device and the second storage device are connected to enable mutual communication via a second communication path that provides data communication in block units; and the copy control section transfers and copies the copy target data from the first volume to the second volume via the second communication path.

5. The file sharing system according to claim 4, wherein the second volume stores copy source volume identification information for identifying the first volume as a copy source with the second volume; and the reproduction section reproduces the single logical directory structure that is formed by virtually integrating the second directory structure by using the copy source volume identification information, the first management information, and the second management information.

6. The file sharing system according to claim 1, wherein the plurality of first file sharing devices and the plurality of second file sharing devices hold the first management information and the second management information, and on a condition that either the first site or the second site under goes a change to the single logical directory structure or a copy-related structure, differential information related to the structural change is reported to the plurality of first file sharing devices and the second file sharing device, and the differential information is reflected in the first management information or the second management information held by the plurality of first file sharing devices and the plurality of second file sharing devices.

7. A method of generating a single logical directory structure by using a file sharing system, the file sharing system having a first site including a plurality of first file sharing devices, operated by a computer device, a second site including a plurality of second file sharing devices, operated by a computer device, the plurality of first file sharing devices and the plurality of second file sharing devices are connected via a first communication path to enable mutual communication, the method comprising the steps of:

setting first management information for managing associated relationships between the single logical directory structure which is generated across the plurality of first file sharing devices using a global name space (GNS) and a first directory structure that the plurality of first file sharing devices comprise;

providing a client device, operated by a computer device, with the single logical directory structure that is formed by using the first management information to virtually integrate the first directory structures, wherein the first management information includes directory names of the first directory structures, responsibility information for specifying the first file sharing devices responsible for the first directory structures and a first storage position for indicating the first storage position of the data managed by the first file sharing devices;

setting second management information for managing associated relationships between the first storage positions of the data managed by the plurality of first file sharing devices and the second storage positions of the data managed by the plurality of second file sharing devices;

transmitting and copying copy target data among the data that are stored in the plurality of first file sharing devices to the plurality of second file sharing devices that are associated with the plurality of first file sharing devices by using the second management information, wherein the second management information includes the first storage position and the second storage position of the data managed by the second file sharing devices and copy destination information, wherein the copy destination information specifies the second file sharing devices that are associated with the first file sharing devices;

detecting whether a fault has occurred in the first site; and reproducing the single logical directory structure by virtually integrating the second directory structure of the plurality of second file sharing devices using the first management information and the second management information and by using the copy destination information which includes the same information as the responsibility information on a condition that a fault occurs at the first site.

8. A file sharing system having a first site and a second site, wherein (1) the first site comprises:

(1-1) a plurality of first file sharing devices, operated by a computer device, each having a first directory structure;

(1-2) a first storage device, operated by a computer device, which is connected via a first intra-site communication network to the plurality of first file sharing devices, and which supplies a first volume to the plurality of first file sharing devices; and (1-3) a master device, operated by a computer device, that issues a predetermined report to the plurality of first file sharing devices; and (2) the second site comprises:

(2-1) a plurality of second file sharing devices, operated by a computer device, each having a second directory structure;

(2-2) a second storage device, operated by a computer device, which is connected via a second intra-site communication network to the plurality of second file sharing devices, and which supplies a second volume to the plurality of second file sharing devices; and (2-3) a submaster device, operated by a computer device, that issues a predetermined report to the plurality of second file sharing devices;

(3) the plurality of first file sharing devices and the plurality of second file sharing devices are connected via a first communication path, and the first storage device and the second storage device are connected via a second communication path that is provides data communication in block units;

(4) the plurality of first file sharing devices, the plurality of second file sharing devices, the master device, and the submaster device each hold a management table, and the management table includes directory names that correspond to node names of the first directory structure, responsibility information for specifying the plurality of first file sharing devices responsible for each of the directory names, first storage position information indicating the first storage positions of the data managed by the plurality of first file sharing devices, copy destination device information for specifying the plurality of second file sharing devices corresponding to the plurality of first file sharing devices, and second storage position information indicating the second storage positions of the data managed by the plurality of second file sharing devices;

(5) the master device generates a single logical directory structure that is generated across the plurality of first file sharing devices using a global name space (GNS) and the management table and supplies the single logical directory structure to a client device, wherein the management table includes first management information including directory names of the first directory structures, responsibility information for specifying the first file sharing devices responsible for the first directory structures and a first storage position for indicating the first storage position of the data managed by the first file sharing devices and second management information including the first storage position and the second storage position of the data managed by the second file sharing devices and copy destination information, wherein the copy destination information specifies the second file sharing devices that are associated with the first file sharing devices;

(6) the plurality of first file sharing devices transmit data that are stored in the first volume to the respective second file sharing devices via the first communication path by using the management table and storing the data in the second volume; and (7) the submaster device reproduces the single logical directory structure by virtually integrating a second directory structure of the plurality of second file sharing devices using the first management information and the second management information and by using the copy destination information in the management table, which includes the same information as the responsibility information, on a condition that a fault occurs at the first site.

* * * * *